(12) United States Patent
Väänänen

(10) Patent No.: US 10,904,929 B2
(45) Date of Patent: Jan. 26, 2021

(54) SECURE COMMUNICATION SYSTEM

(71) Applicant: Uniraja Ou, Harjumaa (EE)

(72) Inventor: Johannes Väänänen, Tallinn (EE)

(73) Assignee: UNIRAJA OU, Harjumaa (EE)

( * ) Notice: Subject to any disclaimer, the term of this patent is extended or adjusted under 35 U.S.C. 154(b) by 343 days.

(21) Appl. No.: 16/130,767

(22) Filed: Sep. 13, 2018

(65) Prior Publication Data

US 2019/0141757 A1    May 9, 2019

Related U.S. Application Data

(60) Provisional application No. 62/583,958, filed on Nov. 9, 2017.

(51) Int. Cl.
| | |
|---|---|
| *H04W 12/10* | (2009.01) |
| *G06N 20/00* | (2019.01) |
| *H04W 12/00* | (2009.01) |
| *H04W 76/10* | (2018.01) |
| *H04L 29/06* | (2006.01) |
| *H04W 4/12* | (2009.01) |

(52) U.S. Cl.
CPC ............ *H04W 76/10* (2018.02); *G06N 20/00* (2019.01); *H04W 12/001* (2019.01); *H04W 12/10* (2013.01); *H04W 12/1002* (2019.01); *H04L 63/0428* (2013.01); *H04L 63/18* (2013.01); *H04W 4/12* (2013.01)

(58) Field of Classification Search
CPC ............ H04W 76/10; H04W 12/1002; H04W 12/001; H04W 12/10; H04W 4/12; G06N 20/00; H04L 63/0428; H04L 63/18
See application file for complete search history.

(56) References Cited

U.S. PATENT DOCUMENTS

2006/0246911 A1* 11/2006 Petermann ............ H04W 16/26
                                                        455/444
2008/0209046 A1   8/2008 Karkanias et al.
(Continued)

OTHER PUBLICATIONS

Xiaofei Wang, et al. Artificial Intelligence-Based Techniques for Emerging Heterogeneous Network: State of the Arts, Opportunities, and Challenges, published on Aug. 11, 2015, 13 pages.

*Primary Examiner* — Techane Gergiso
(74) *Attorney, Agent, or Firm* — Patterson + Sheridan, LLP

(57) ABSTRACT

A communication system for communicating messages in communication network including first communication device, second communication device and multiple radios. A first radio of the multiple radios receives first message from first communication device via a wireline. The artificial intelligence module determines a coverage area of the first radio. Further, the artificial intelligence module determines at least one radio link for connecting to a second radio outside the coverage area of first radio. The second radio receives the first message wirelessly from the first radio. The artificial intelligence module further determines a first set of radio links for connecting a first set of radios to establish first wireless communication channel between first radio and second radio. The first set of radios communicates first message to the second radio via the first wireless communication channel. Finally, the second communication device receives the first message from the second radio via the wireline.

33 Claims, 22 Drawing Sheets

(56) References Cited

U.S. PATENT DOCUMENTS

| | | |
|---|---|---|
| 2013/0080616 A1 | 3/2013 | Tsui et al. |
| 2014/0257953 A1 | 9/2014 | Kaplan et al. |
| 2016/0105291 A1 | 4/2016 | Anchan |
| 2017/0150368 A1* | 5/2017 | Ngo .......................... G01S 5/02 |
| 2018/0109975 A1* | 4/2018 | Kalliola .............. H04L 43/0876 |
| 2018/0293897 A1* | 10/2018 | Murphy ............... G05D 1/0022 |

* cited by examiner

SECURE COMMUNICATION SYSTEM

CROSS-REFERENCE TO RELATED APPLICATIONS

This application claims benefit of U.S. provisional patent application Ser. No. 62/583,958, filed Nov. 9, 2017, which is herein incorporated by reference.

TECHNICAL FIELD

The invention generally relates to a secure communication system, and more specifically to a secure communication system for communicating messages in a military or civil servant communication network.

BACKGROUND

Long range radio communication is one of the most reliable options for secure communication. Private agencies, military organizations, and civil organizations are few examples that deploy long range radio communication for cost-effective, secure, and effective communication. For instance, during emergency situations, the military organizations may deploy long range radio communication for secure text messaging.

In certain cases, the long range radio communication may be dependent on infrastructure, such as high antennas and ground cables, or may be based on mobile base stations. In an example, during peace time, the long range radio communication deployment by the military organizations may take place based on the fixed infrastructure, such as antennas placed on mobile masts. Consequently, the infrastructure dependent based long range radio communication is significantly vulnerable to attacks by enemies as positions of the mobile masts are generally known to the enemies, and can be easily attacked. Similarly, communication via mobile base stations is also susceptible to attacks by the enemies as positions of the mobile base stations can be easily located.

In recent years, organizations have started using satellite communication, that is, SATCOM systems for communication purposes. However, such systems are cost-intensive and require skilled people for its operation. Thus, the currently available techniques for long range radio communication are cost-intensive and unreliable.

A wireless opportunistic network that can facilitate data transfer by way of interconnected devices is disclosed in US 20080209046A1. This document is cited here as reference.

An information dissemination method and apparatus that facilitates transmission of information to primary receivers and re-transmission to secondary receivers using native mobile devices is disclosed in US 20140257953A1. This document is also cited here as reference.

How to establish a multicast signalling control channel based on a multicast address that is related to floor arbitration for a peer-to-peer session is analyzed in US 20160105291A1. This document is also cited here as reference.

Peer-to-peer sharing of functionality of mobile devices is disclosed in US 20130080616A1. This document is also cited here as reference.

Artificial intelligence-based techniques for emerging heterogeneous network are analyzed in document titled "Artificial Intelligence-Based Techniques for Emerging Heterogeneous Network: State of the Arts, Opportunities, and Challenges". This document is also cited here as reference.

However, the prior art is deficient in techniques that may facilitate secure and cost-effective communication for deployment by military organizations.

SUMMARY

Aspects of the invention address and improve the aforementioned deficiencies in the prior art.

Other aspects of the invention facilitate communication of messages in a communication network comprising a first communication device, a second communication device and a plurality of radios.

In one aspect of the invention, a first communication device sends a first message to a first radio of a plurality of radios via a wireline. The first communication device encrypts the first message and then sends the encrypted first message to the first radio, which can send it over the air. The first message may be e.g. a text message of up to 400 characters.

In another aspect of the invention, the artificial intelligence module determines coverage area of the first radio. A coverage area of a radio may be understood as a geographical area within which the radio can communicate based on its broadcast power and frequencies, quality of antennae, amount of radio disturbances, terrain conditions, and weather conditions.

In a further aspect of the invention, an artificial intelligence module governs the network and determines a second radio link of the plurality of radio links link for connecting to a second radio of the plurality of radios that is outside the coverage area of the first radio. The second radio is to receive the first message from the first radio. In an example, the second radio is outside the coverage area of the first radio if distance between the first radio and the second radio is such that both the radios cannot communicate directly with each other.

When the second radio is outside the coverage area of the first radio, the artificial intelligence module determines a first set of radio links for connecting to a first set of radios of the plurality of radios to establish a first wireless communication channel between the first radio and the second radio for communicating the first message wirelessly. The artificial intelligence module uses deep learning algorithms and a map of data of error proneness and operation of communication channels between each radio link. The artificial intelligence module avoids routes of radios that are analyzed to be unreliable in different critical situations based on communication history.

Then the first set of radio links for connecting to the first set of radios that is determined by the artificial intelligence module communicates the first message to the second radio using the first wireless communication channel. The second communication device receives the first message from the second radio via the wireline. In an example, the second radio receives the encrypted first message from the first radio and forwards the encrypted first message to the second communication device. The second communication device decrypts the first message. The wireline connection is an electrical conductor between separate devices or an electrical conductor within an integrated device.

A communication system for communicating messages in a communication network comprising a first communication device, a second communication device and a plurality of radios is in accordance with the invention and is characterised in that, a first radio of the plurality of radios is configured to receive a first message from the first communication device via a wireline;
at least one artificial intelligence module configured to determine a coverage area of the first radio;
the at least one artificial intelligence module is configured to determine a second radio link of a plurality of radio links for connecting to a second radio of the plurality of radios is outside the coverage area of the first radio, wherein the second radio is configured to receive the first message wirelessly from the first radio;
the at least one artificial intelligence module is configured to determine a first set of radio links for connecting to a first set of radios of the plurality of radios to establish a first wireless communication channel between the first radio and the second radio, when the second radio is outside the coverage area of the first radio;
the at least one artificial intelligence module is configured to determine a coverage area of the first radio;
the first set of radios is configured to communicate the first message to the second radio via the first wireless communication channel; and
the second communication device is configured to receive the first message from the second radio via the wireline.

A method for communicating messages in a communication network, comprising a first communication device, a second communication device, and a plurality of radios, is in accordance with the invention and is characterised by the following steps:
receiving a first message from the first communication device via a wireline, by a first radio of the plurality of radios;
determining a coverage area of the first radio by at least one artificial intelligence module;
determining a radio link of the plurality of radio links for connecting to a second radio of the plurality of radios is outside the coverage area of the first radio by the at least one artificial intelligence module, wherein the second radio is configured to receive the first message wirelessly from the first radio;
determining a first set of radios of the plurality of radios to establish a first wireless communication channel between the first radio and the second radio by the at least one artificial intelligence module, when the second radio is outside the coverage area of the first radio;
communicating the first message to the second radio via the first wireless communication channel; and
receiving the first message from the second radio by the second communication device via the wireline.

A software program product stored in a memory medium for communicating messages in a communication network comprising a first communication device, a second communication device, and a plurality of radios, is in accordance with the invention and is characterised by the following steps:
a first radio of the plurality of radios is configured to receive a first message from the first communication device via a wireline;
at least one artificial intelligence module is configured to determine a coverage area of the first radio;
the at least one artificial intelligence module is configured to determine a radio link of the plurality of radio links for connecting to a second radio of the plurality of radios is outside the coverage area of the first radio, wherein the second radio is configured to receive the first message wirelessly from the first radio;
the at least one artificial intelligence module is configured to determine a first set of radio links of the plurality of radio links for connecting to a first set of radios of the plurality of radios to establish a first wireless communication path between the first radio and the second radio, when the second radio is outside the coverage area of the first radio;
the at least one artificial intelligence module is configured to determine a coverage area of the first radio;
the first set of radios is configured to communicate the first message to the second radio via the first wireless communication path; and
the second communication device is configured to receive the first message from the second radio via the wireline.

Aspects of the invention have sizable advantages. Various embodiments may result in an economical, infrastructure independent, and secure communication of messages in the communication network. The communication system is a cost-effective and a reliable system for private agencies, military organizations, and civil organizations that allows senders to send text and data messages to large geographical distances in a secure manner. The communication system is implemented to use cost-effective radios, modems, and communication devices to communicate the messages between a sender and a receiver, even in situations when the network is affected by technical failures. For example, if some frequencies are jammed in the network, the communication system may select another frequency in the network for communicating the messages. By using multiple radios in the network that are situated between the sender and the receiver as relay stations, the message is communicated securely and in minimal time. Thus, the invention results in time-effective, secure, and cost-effective communication of messages.

A particular embodiment of the invention is the communication of messages between two soldiers of a military organization with digital tablet computers that are connected via wireline to walkie talkie radios. The soldiers, for example, soldier A and soldier B may exchange the messages using respective tablet computers. Further, walkie talkie radio of the soldier B may be outside the coverage area of the walkie talkie radio of the soldier A. When the soldier A wishes to communicate with the soldier B, the soldier A may type a message to be communicated to the soldier B using his tablet computer. Further, since the walkie talkie radio of the soldier B is outside the coverage area of the walkie talkie radio of the soldier A, the message is not directly communicated to the soldier B. For communication of the message from soldier A to soldier B, a set of radios that are situated between the walkie talkie radios of the soldier A to soldier B are selected. The set of radios act as relay stations for transmission of the message wirelessly from the tablet computer of the soldier A to the tablet computer of the soldier B.

The best mode of the invention makes it possible to economically, timely, and securely communicate the messages in the communication network covering large geographical area.

The dependent claims describe other embodiments of the invention.

DETAILED DESCRIPTION OF EMBODIMENTS

The present disclosure provides a communication system, method, and a software program product for communicating messages in a communication network comprising a first communication device, a second communication device and a plurality of radios. A first radio of the plurality of radios receives a first message from the first communication device via a wireline. Further, the first radio determines its coverage area. Subsequently, an artificial intelligence module determines a second radio of the plurality of radios is outside the coverage area of the first radio. The second radio is configured to receive the first message wirelessly from the first radio. Additionally, the artificial intelligence module determines a first set of radios of the plurality of radios to establish a first wireless communication channel between the first radio and the second radio, when the second radio is outside the coverage area of the first radio. Thereafter, the first set of radios communicates the first message to the second radio via the first wireless communication channel. Subsequently, the second communication device receives the first message from the second radio via the wireline.

Figure 1A:
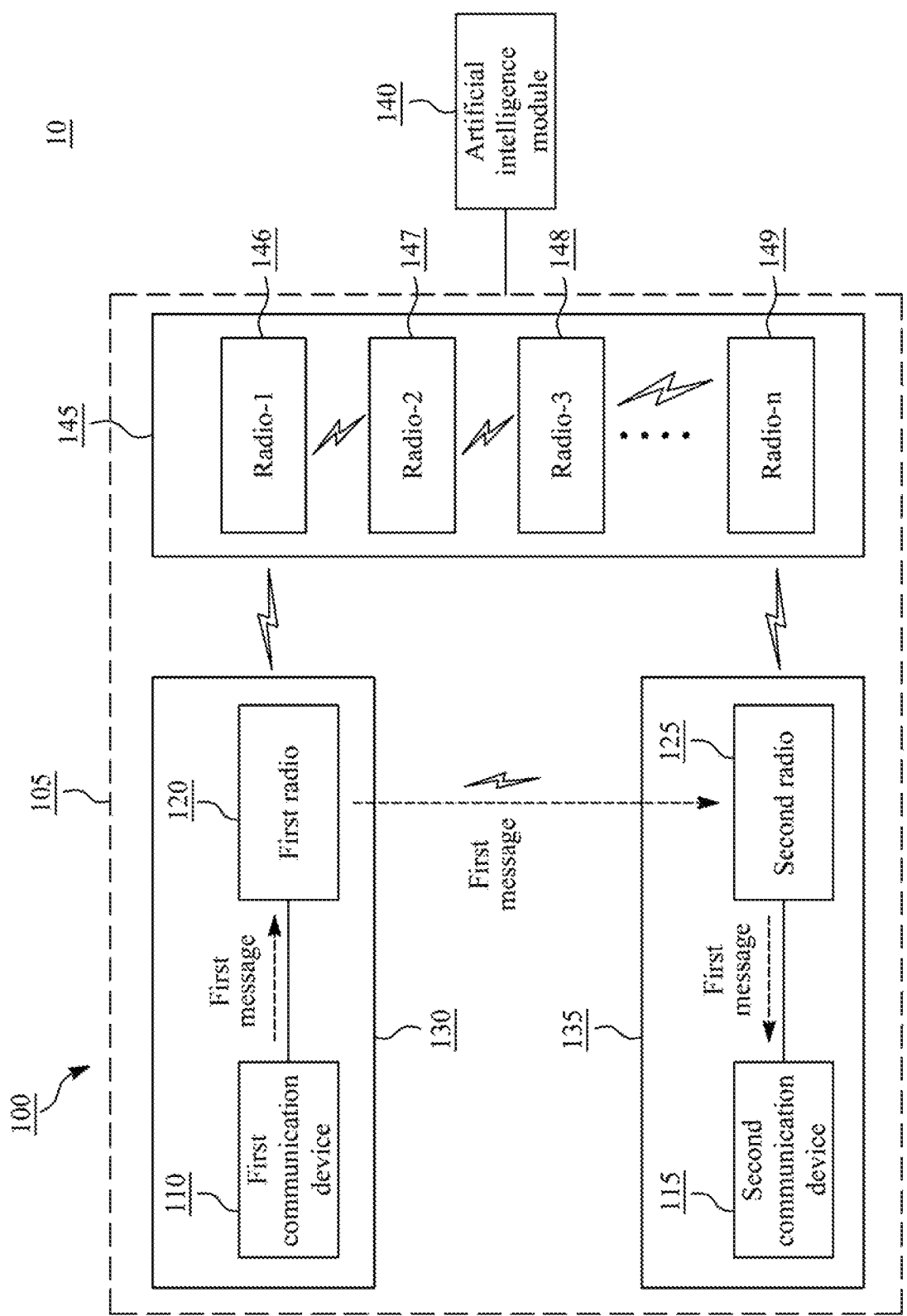
FIG. 1A demonstrates an embodiment 10 of a communication system for communicating a first message in a communication network from a first communication device to a second communication device, in accordance with the invention as a block diagram.

FIG. 1A demonstrates an embodiment 10 of a communication system 100 for communicating a first message in a communication network 105 from a first communication device 110 to a second communication device 115, in accordance with the invention as a block diagram. The communication system 100 may also be referred to as a Last Resource Communication (LRC) system that is typically used by the military and civil organizations for secure text messaging, however consumers or anyone else may use the invention in some embodiments too.

The communication network used for the communication in the invention is the walkie talkie network adjacent to the communication device and/or the wireless or wireline Internet or the telephony network, which is typically a cellular network such as UMTS-(Universal Mobile Telecommunication System), GSM-(Global System for Mobile Telecommunications), GPRS-(General Packet Radio Service), CDMA-(Code Division Multiple Access), 3G-, 4G-, Wi-Fi and/or WCDMA (Wideband Code Division Multiple Access)-network. Multiple different network types can be used in a single embodiment of the invention.

According to an embodiment, the communication network 105 comprises the first communication device 110, the second communication device 115, and multiple radios (also referred to as radio stations). In an example, the multiple radios include a first radio 120 and a second radio 125, along with various other radios. Each radio, whether handheld, mobile or stationary, is a receiver, relay and/or base-station that may be used for communicating messages. For example, the radios may be two-way radios. A two-way radio is a radio that may operate two ways, that is, it has the ability to both transmit and receive a radio signal.

The first communication device 110 and the second communication device 115, typically tablet computers, laptops, smartphones, and/or small processing units with a two way radio walkie talkie capability incorporated or connected into them are used to send/receive messages to/from other communication devices. The first communication device 110 and/or the second communication device 115 are typically tablet computers with a two way radio walkie talkie connected to them via wireline, such as iOS, Android or Windows tablet computers. However, it is also possible that the first communication device 110 and/or the second communication device 115 are mobile stations, mobile phones or computers, such as a PC-computer, Apple Macintosh-computer, PDA-device (Personal Digital Assistant), or UMTS-(Universal Mobile Telecommunication System), GSM-(Global System for Mobile Telecommunications), WAP-(Wireless Application Protocol), Teldesic-, Inmarsat-, Iridium-, GPRS-(General Packet Radio Service), CDMA-(Code Division Multiple Access), GPS-(Global Positioning System), 3G-, 4G-, Bluetooth-, WLAN-(Wireless Local Area Network), Wi-Fi and/or WCDMA (Wideband Code Division Multiple Access)-mobile stations with a two way radio walkie talkie capability. Sometimes in some embodiments the first communication device 110 and/or the second communication device 115 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system and a two way radio walkie talkie capability incorporated or connected into them.

According to an embodiment, the first communication device 110 and the first radio 120 may be implemented together in a single enclosure, hereinafter referred to as a first apparatus 130. Similarly, the second communication device 115 and the second radio 125 may be implemented together in a second apparatus 135. In said embodiment, the first communication device 110 and the first radio 120 are directly connected to each other. For instance, the first communication device 110 and the first radio 120 may be connected through wires and/or physical cables. Likewise, the second communication device 115 and the second radio 125 are also directly connected to each other. Further, the communication system 100 includes at least one artificial intelligence module 140. The artificial intelligence module 140 operates in real-time over all the radios in the communication network 105. Further, the artificial intelligence module 140 is multi-tasked between different radios and may combine parts of data from the multiple radios. Although FIG. 1A shows only two communication devices, one of ordinary skill in the art may appreciate that three or more communication devices may be a part of the communication system 100.

In one example, the radios may be 5 Watt civil handheld radios and the communication devices may be 7 inch tablet computers. In another example, the radios may be 25 Watt civil car radios and the communication devices may be inexpensive laptop computers. Further, no additional components or infrastructure is required. The radios and the communication devices may be recharged using energy sources, such as car battery, power bank, and solar panels.

In operation, when a user of the first communication device 110, for example user A, wishes to communicate with a user of the second communication device 115, for example, user B, the user A may send a message to the user B. In an embodiment, the first communication device 110 is configured to have an application (not shown in FIG. 1A) installed in a memory or data storage that allows the user A to type a first message to be communicated to the user B. The first message may be a "packet" type message. For instance, the first message may be a small data packet. As a result, the first message is communicated from one radio to another radio in minimal time, and consequently, it becomes difficult for an enemy to track the first message.

In an example, the first message may be a text message of up to 400 characters, and preferably less than 100 characters. Once the user A types the first message, the first radio 120 may receive the first message from the first communication device 110 via a wireline. On receiving the first message, artificial intelligence module 140 may determine its coverage area. A coverage area of a radio may be understood as a geographical distance within which the radio can communicate based on its broadcasting power and range. For example, if the artificial intelligence module 140 determines its coverage area to be 10 km, then the first radio 120 can communicate with other radios that are within the range of 10 km. Although, it is described that the artificial intelligence module 140 determines its coverage area, it may be understood that the first communication device 110 may determine the coverage area for the first radio 120.

Subsequently, the artificial intelligence module 140 determines if the second radio 125 is outside the coverage area of the first radio 120. In an example, the second radio 125 is said to be outside the coverage area of the first radio 120 if distance between the first radio 120 and second radio 125 is such that both the radios cannot communicate directly with each other. The second radio 125 is configured to receive the first message wirelessly from the first radio 120.

In an embodiment, a database (not shown in FIG. 1A) may be communicatively coupled to the artificial intelligence module 140. The database may be an external repository associated with the artificial intelligence module 140, or an internal repository within the artificial intelligence module 140. The database may store all the data related to the first communication device 110, the second communication device 115, the first radio 120, the second radio 125, and other radios. In an example, the database may store information regarding coverage area limits for the radios. Accordingly, the artificial intelligence module 140 may access the database to determine if the second radio 125 is outside the coverage area of the first radio 120. In one example, if the coverage area of the first radio 120 is 100 km and distance between the first radio 120 and the second radio 125 is 150 km, then it may be determined that the second radio 125 is outside the coverage area of the first radio 120.

On determining the second radio 125 to be outside the coverage area of the first radio 120, the artificial intelligence module 140 is configured to determine a first set of radio links for connecting to a first set of radios 145 from amongst the multiple radios to establish a first wireless communication channel between the first radio 120 and the second radio 125. The first set of radios 145 may comprise radio-1 146, radio-2 147, radio-3 148, and radio-n 149. In an example, the first wireless communication channel may be indicative of a routing path for transmission of the first message from the first radio 120, associated with the first communication device 110, to the second radio 125, associated with the second communication device 115. In other words, since there is no direct link between the first radio 120 and the second radio 125, the artificial intelligence module 140 determines a set of radio links that are situated between the first radio 120 and the second radio 125 as relay stations for transmission of the first message wirelessly from the first radio 120 to the second radio 125.

Further, the first set of radios 145 communicates the first message to the second radio 125 via the first wireless communication channel. In an example, the first message hops from one radio to another radio of the first set of radios 145 until the first message reaches the second radio 125. As a result, the first message is received by the second radio 125 in minimal time, for example, few seconds. Finally, the second communication device 115 receives the first message from the second radio 125 via the wireline.

Any features of embodiment 10 may be readily combined or permuted with any of the other embodiments 11, 12, 13, 14, 15, 16, 20, 21, 22, 23, 24, 25, 26, 30, 31, 32, 33, 34, 35, and/or 36 in accordance with the invention.

Figure 1B:
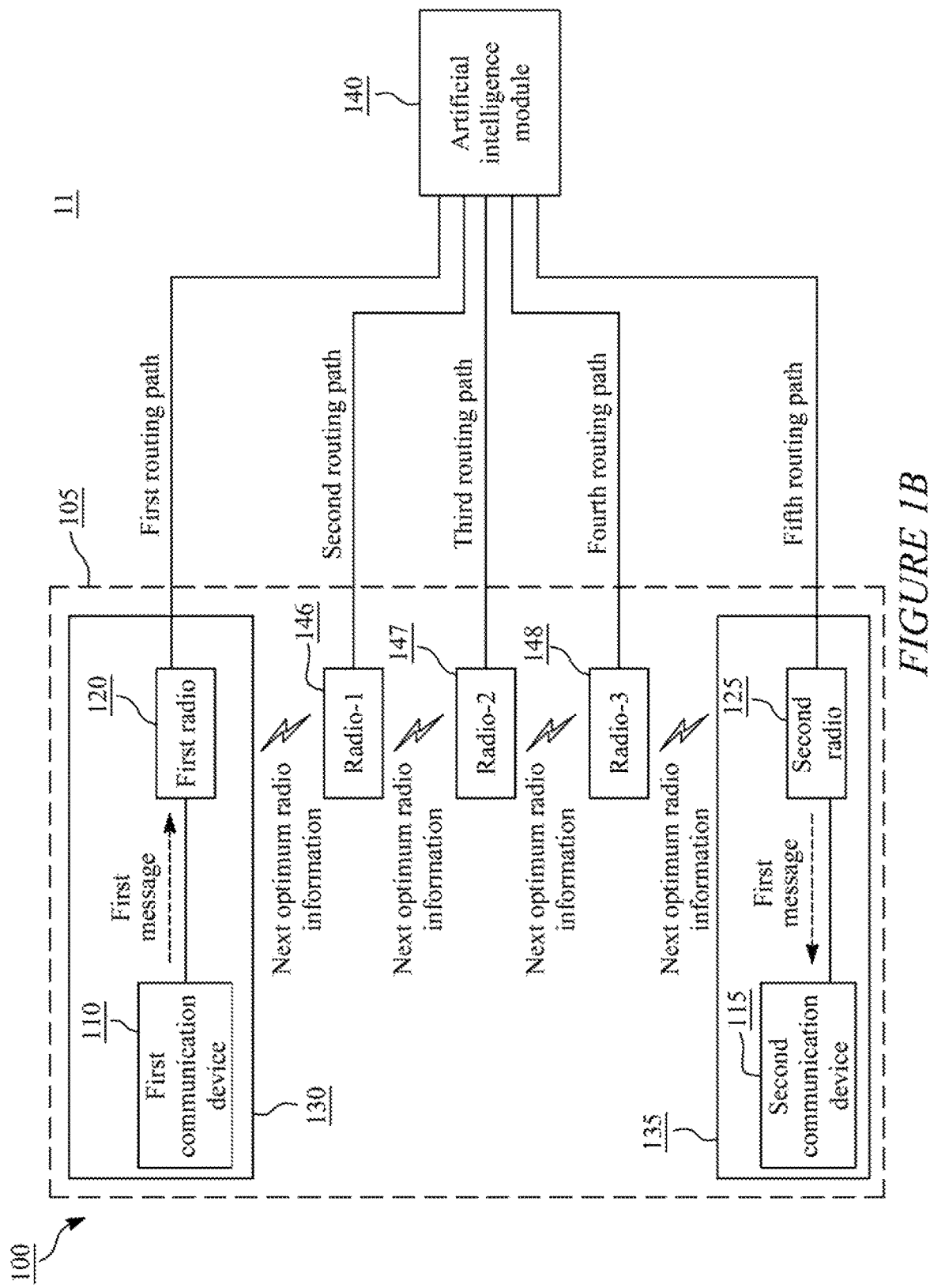
FIG. 1B demonstrates an embodiment 11 of the communication system comprising an artificial intelligence module for handling routing paths between plurality of radios, in accordance with the invention as a block diagram.

FIG. 1B demonstrates an embodiment 11 of the communication system 100 comprising the artificial intelligence module 140 for handling routing paths between the multiple radios, in accordance with the invention as a block diagram.

As described earlier, since there is no direct connection between the first radio 120, associated with the first communication device 110, and the second radio 125 associated with the second communication device 115, the artificial intelligence module 140 determines the first set of radio links for connecting to the first set of radios 145 to communicate the first message wirelessly from the first radio 120 to the second radio 125 via the first wireless communication channel established by the first set of radios 145.

According to an embodiment, the artificial intelligence module 140 handles as a whole routing paths from the first radio 120 to the second radio 125 such that part of data of each of the first set of radios 145 includes information related to only next optimum radio to pass on the first message. In an example, the artificial intelligence module 140 comprises data of the whole routing paths including all middle points in the whole routing paths.

In an example, there may be total 12 radios in the communication network 105, excluding the first radio 120 and the second radio 125. Further, there is no direct connection between the first radio 120 and the second radio 125 as the distance between the two is beyond the coverage area. The first radio 120 sends a first message to the second radio 125. Subsequently, the artificial intelligence module 140 determines a first set of radio links for connecting to a first set of radios 145 from amongst the 12 radios to establish a routing path to transmit the first message wirelessly from the first radio 120 to the second radio 125. As shown in FIG. 1B, the artificial intelligence module 140 determines a first set of radio links for connecting to the first set of radios 145 including radio-1 146, radio-2 147, and radio-3 148. Thus, the routing path indicates a path "first radio 120→radio-1 146→radio-2 147→radio-3 148→second radio 125". Each of the radio-1 146, radio-2 147, and radio-3 148 includes information related to only the next optimum radio to pass on the first message wirelessly. Further, the artificial intelligence module 140 includes information regarding routing paths for each radio. In an example, the artificial intelligence module 140 may include information of a first routing path for the first radio 120, a second routing path for the radio-1 146, a third routing path for the radio-2 147, a fourth routing path for the radio-3 148, and a fifth routing path for the second radio 125. In said example, the first message is transferred from the first radio 120 to the radio-1 146, then from the radio-1 146 to the radio-2 147, then from the radio-2 147 to the radio-3 148, and finally from the radio-3 148 to the second radio 125.

Further, the artificial intelligence module 140 may continuously monitor the message transmission from the first radio 120 to the second radio 125 to maintain data integrity. If the artificial intelligence module 140 identifies that the data integrity is compromised, for example, by spyware or malicious data is added to the first message during the transmission, the artificial intelligence module 140 may stop transmission of the first message.

Any features of embodiment 11 may be readily combined or permuted with any of the other embodiments 10, 12, 13, 14, 15, 16, 20, 21, 22, 23, 24, 25, 26, 30, 31, 32, 33, 34, 35, and/or 36 in accordance with the invention.

Figure 1C:
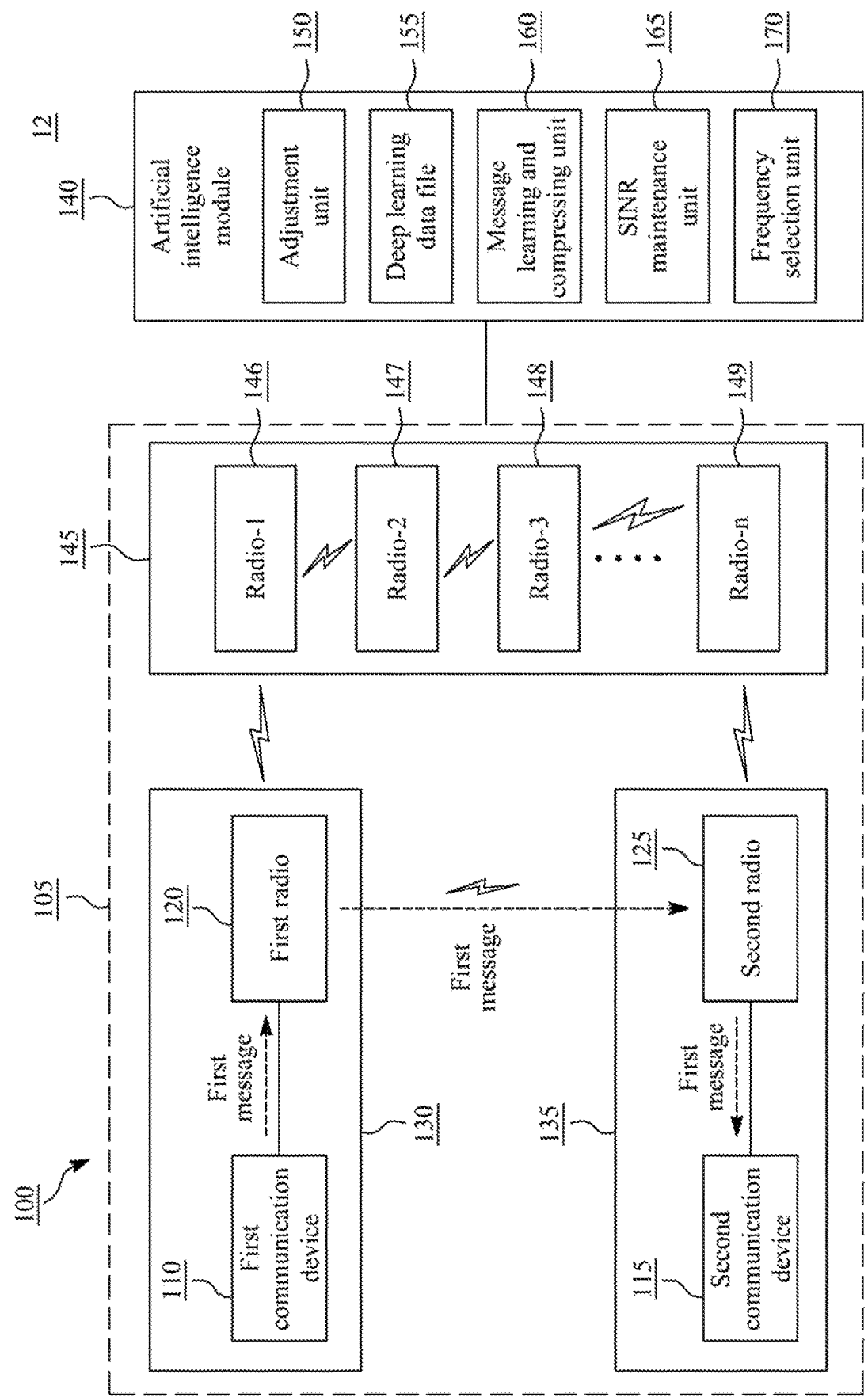
FIG. 1C demonstrates an embodiment 12 of the artificial intelligence module comprising an adjustment unit, a deep learning data file, message learning and compressing unit, a signal-to-interference-plus-noise ratio (SINR) maintenance unit, and a frequency selection unit, in accordance with the invention as a block diagram.

FIG. 1C demonstrates an embodiment 12 of the artificial intelligence module 140 comprising an adjustment unit 150, a deep learning data file 155, a message learning and compressing unit 160, a signal-to-interference-plus-noise ratio (SINR) maintenance unit 165, and a frequency selection unit 170, in accordance with the invention as a block diagram.

According to an embodiment, the artificial intelligence module 140 comprises the adjustment unit 150 to adjust communicating quota for each radio based on its need to communicate data from each radio. In an example, communicating quota for a radio may be indicative of a right, or capacity, to use a radio channel for that radio. The adjustment unit 150 is configured to adjust the communicating quota for radios to maintain optimum network integrity in the communication network 105.

Further, the artificial intelligence module 140 comprises the deep learning data file 155. In an example, the deep learning data file 155 includes deep learning algorithms. According to said example, the first message hops wirelessly from one radio to another radio of the routing path until the first message is received by the second radio 125, based on the deep learning algorithms. In other words, the first message is guided based on the deep learning algorithms. If any radio in the routing path is in a non-active state, the artificial intelligence module 140 may automatically determine another routing path for communication of the first message to the second radio 125. Therefore, as long as there are radios in the communication network 105 and some of the radios can communicate with each other, the first message gets delivered to the second radio 125. In an example, if a radio is switched-off or in a voice mode, then the radio is said be to in a non-active state.

The objective of the artificial intelligence module 140 is to ensure that the first message is securely transmitted to the second radio 125 using the deep learning algorithms. In an example, the artificial intelligence module 140 monitors all the transmitted messages and the receiving percentages of the transmitted messages for intermediate radios and the receiving radio (end recipient). If a message is not transmitted, the artificial intelligence module 140 examines the type of network topology, including reception percentage of the network or network link(s) at the present time or in the past. Based on the type of network topology and reception percentage, the artificial intelligence module 140 adds negative weight of such a configuration. When more messages are transmitted, the artificial intelligence module 140 increases positive weight of such network topology. In an example, the artificial intelligence module 140 selects the routing path based on the highest positive weight of the selected network topology. Further, the artificial intelligence module 140 may spin through all the possible radio stations and examine which radio stations would provide the optimum throughput and thus the highest positive weight to select the routing path.

According to an embodiment, the artificial intelligence module 140 is configured to use deep learning algorithms and a map of error proneness and operation data of communication channels between each radio to avoid routes that seem to work perfectly at a particular time but based on communication history of the radios are analyzed to be unreliable in different critical situations. In an example, the communication history of the radios may be stored in the database. Further, examples of the critical situations include, but are not limited to, a high channel load, a date, a daytime, user interface usage, a battery voltage, environment light, global positioning system (GPS) coordinates, and motion states of the plurality of radios determined by a motion sensor.

In an example, when no acknowledgment of the transmitted message is received, the transmitting radio station would know that the message has not been received by the receiving radio station. By detecting the received and non-received acknowledgements the map of error proneness is obtained. Further, the map of error proneness is used by the artificial intelligence module 140 to gather information about the successful throughput percentage of each individual communication channel. The information is then used to establish the routing path. There are other error parameters related to a non-individual communication connection, such as the number of relay stations that decreases the probability of a final throughput of the message, that could be taken into account by the artificial intelligence unit 140.

In some embodiments, the broadcast range of the radio is determined from the acknowledgement messages that the radio receives in response to its messages by the artificial intelligence module 140. If an acknowledgement is received the range is at least more than the distance between the radio and the radio that sent the acknowledgement message.

However, the message can be relayed between direct radio connections between terminals, similarly to a walkie-talkie functionality, but also via the Internet or the telephony network. This will happen when one radio in the set of radios relaying the message decides to, or is instructed by the artificial intelligence module to send the message via the Internet or the telephony network to the next relaying radio in the set of radios.

Additionally, the artificial intelligence module 140 includes the message learning and compressing unit 160. The message learning and compressing unit 160 is configured to learn common message types sent in the communication network 105 and enforce on better compression methods and keywords for the common message types, so that the radios have the messages better coded even before sending the messages.

The artificial intelligence module 140 also comprises the SINR maintenance unit 165 and the frequency selection unit 170. The SINR maintenance unit 165 is configured to maintain a high SINR value for the multiple radios. Further, the frequency selection unit 170 is configured to select, for each of the multiple of radios, an alternate frequency for the communication of the messages when a predetermined frequency is unavailable. For example, if some of the frequencies are jammed, the frequency selection unit 170 may select another frequency in the communication network 105 for communication of messages.

Any features of embodiment 12 may be readily combined or permuted with any of the other embodiments 10, 11, 13, 14, 15, 16, 20, 21, 22, 23, 24, 25, 26, 30, 31, 32, 33, 34, 35, and/or 36 in accordance with the invention.

Figure 1D:
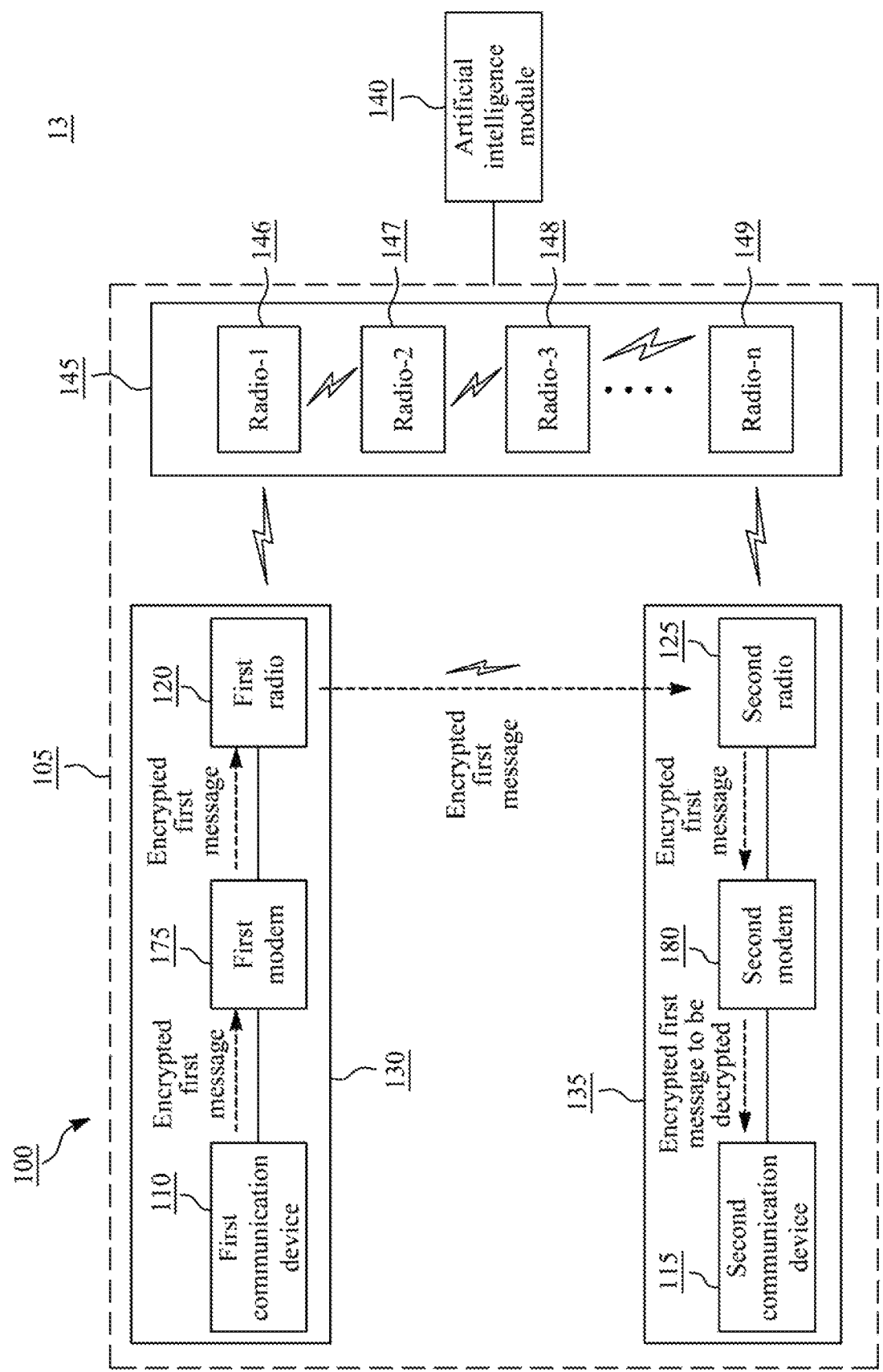
FIG. 1D demonstrates an embodiment 13 of a more elaborate communication system comprising a first communication device and a second communication device for encryption and decryption of the first message, respectively, in accordance with the invention as a block diagram.

FIG. 1D demonstrates an embodiment 13 of a more elaborate communication system 100 comprising a first communication device 110 and a second communication device 115 for encryption and decryption of the first message, respectively, in accordance with the invention as a block diagram.

As shown in FIG. 1D, in addition to the first communication device 110 and the first radio 120, the first apparatus 130 comprises a first modem 175. Similarly, the second apparatus 135 comprises the second communication device 115, the second radio 125, and a second modem 180. In an embodiment, the first communication device 110 and the first modem 175 may be directly connected to each other. For instance, the first communication device 110 and the first modem 175 may be connected through a Universal Serial Bus (USB) port and/or cables. The first radio 120 and the first modem 175 may be also directly connected to each other through USB ports and/or cables. Likewise, the second communication device 115, the second radio 125, and the second modem 180 are directly connected to each other.

In operation, when the user A of the first communication device 110 types and forwards the first message, the first communication device 110 receives the first message via the wireline and encrypts it. The first message is encoded in such a way that only intended recipient (user B in present case) can read it. Further, the first communication device 100 communicates the encrypted first message to the first radio 120 via the wireline. On receiving the encrypted first message, the first radio 120 communicates the encrypted first message wirelessly to the second radio 125. As described earlier, since there is no direct connection between the first radio 120 and the second radio 125, the encrypted first message is wirelessly communicated to the second radio 125 via the first wireless communication channel established by the first set of radios 145.

Upon receiving the encrypted first message, the second radio 125 communicates the encrypted first message to the second communication device 115 via the wireline and the modem 180. The second communication device 115 decrypts the encrypted first message into a readable format.

Any features of embodiment 13 may be readily combined or permuted with any of the other embodiments 10, 11, 12, 14, 15, 16, 20, 21, 22, 23, 24, 25, 26, 30, 31, 32, 33, 34, 35, and/or 36 in accordance with the invention.

Figure 1E:
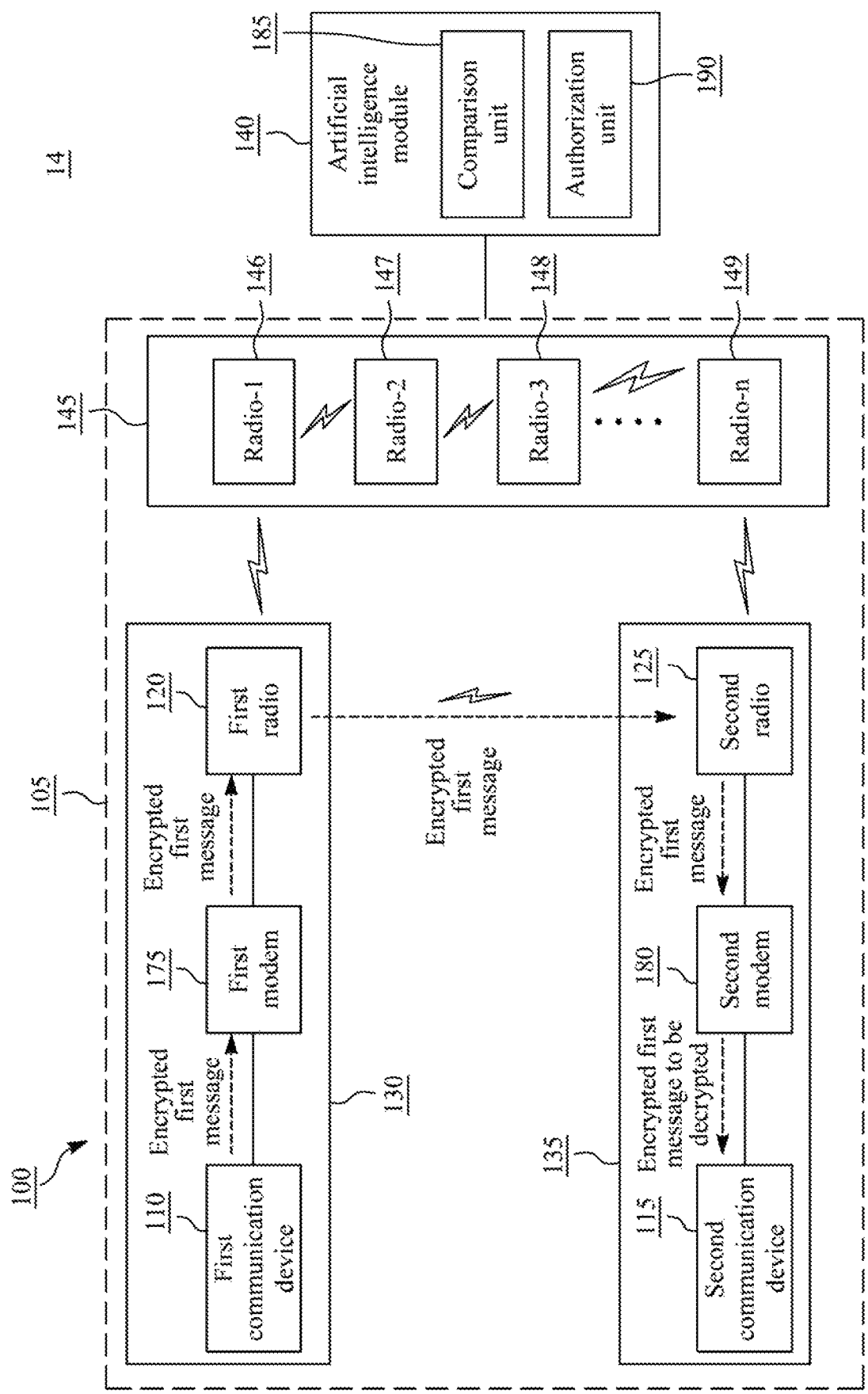
FIG. 1E demonstrates an embodiment 14 of the artificial intelligence module comprising a comparison unit and an authorization unit, in accordance with the invention as a block diagram.

FIG. 1E demonstrates an embodiment 14 of the artificial intelligence module 140 comprising a comparison unit 185 and an authorization unit 190, in accordance with the invention as a block diagram.

In said embodiment, the comparison unit 185 is configured to compare the first message encrypted by the first communication device to check for any discrepancy. Further, the authorization unit 190 may authorize the communication of the first message wirelessly between the first radio 120 and the second radio 125 based on the comparison. For instance, if no discrepancy is found in the comparison results, the artificial intelligence module 140 authorizes the communication of the first message between the first radio 120 and the second radio 125.

Any features of embodiment 14 may be readily combined or permuted with any of the other embodiments 10, 11, 12, 13, 15, 16, 20, 21, 22, 23, 24, 25, 26, 30, 31, 32, 33, 34, 35, and/or 36 in accordance with the invention.

Figure 1F:
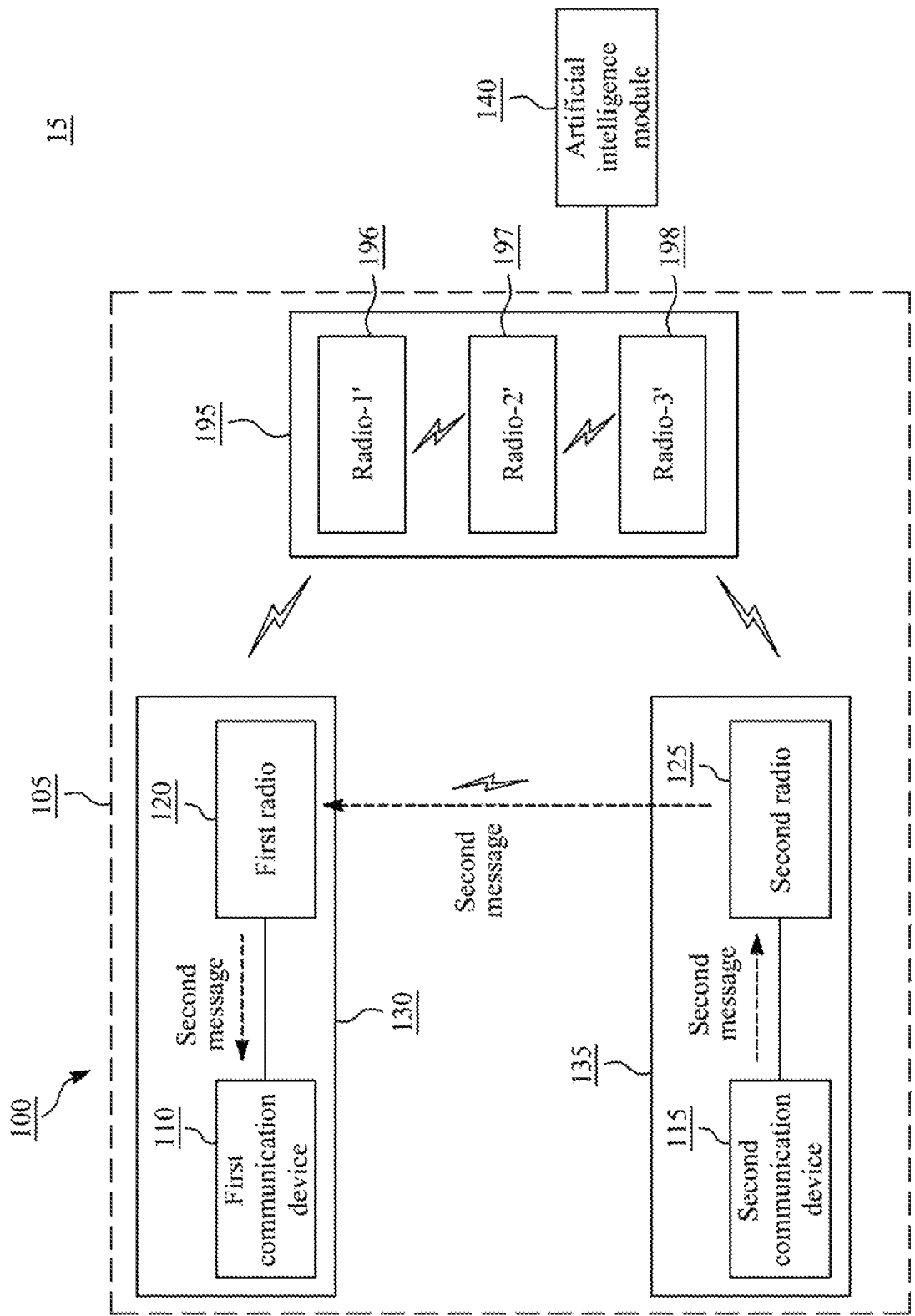
FIG. 1F demonstrates an embodiment 15 of the communication system for communicating a second message in response to the first message from the second communication device to the first communication device, in accordance with the invention as a block diagram.

FIG. 1F demonstrates an embodiment 15 of the communication system 100 for communicating a second message in response to the first message from the second communication device 110 to the first communication device 115, in accordance with the invention as a block diagram.

According to an embodiment, once the second communication device 115 receives the first message from the second radio 125 via the wireline, the second communication device 115 sends a second message to the second radio 125 in response to the first message. Thus, the second radio 125 receives the second message in response to the first message from the second communication device 115. In an example, the second message may be an acknowledgement message to the first message. Thereafter, the artificial intelligence module 140 may identify if at least one radio link for connecting to at least one radio of the first set of radios 145 is unavailable. Subsequently, the artificial intelligence module 140 is configured to determine a second set of radio link for connecting to a second set of radios 195 from amongst the multiple radios to establish a second wireless communication channel between the second radio 125 and the first radio 120, when the at least one radio of the first set of radios 145 is unavailable. The second set of radios 195 may comprise radio-1' 196, radio-2' 197, and radio-3' 198. The second set of radios 195 does not include those radios of the first set of radios 145 that are identified as unavailable. In an example, when a radio is out of order, then the radio is said to be unavailable.

In one example, there may be total 12 radios in the communication network 105, excluding the first radio 120 and the second radio 125. Further, there is no direct connection between the first radio 120 and the second radio 125 as the distance between the two is beyond coverage area. The second radio 125 sends a second message wirelessly to the first radio 120. Subsequently, the artificial intelligence module 140 determines a second set of radio links for connecting to a second set of radios from amongst the 12 radios to establish a routing path to communicate the second message from the second radio 125 to the first radio 120. While determining the second set of radio links, the artificial intelligence module 140 may determine if any of the radios of the first set of radios 145 are out of order. If it is determined that any radio of the first set of radios 145 is out of order, then the routing path that was used for communicating the first message from the first radio 120 to the second radio 125 may not be used for communication of the second message from the second radio 125 to the first radio 120. For example, if all the radios of the first set of radios 145 are out of order, then the artificial intelligence module 140 may determine a completely new routing path for communication of the second message wirelessly from the second radio 125 to the first radio 120 that does not involve the earlier used radios. Further, the communication network 105 is a self-configuring network and the artificial intelligence module 140 may automatically find routing paths around radios that are down.

As shown in FIG. 1F, the artificial intelligence module 140 determines the set of radio links for connecting to the second set of radios 195 including radio-1' 196, radio-2' 197, and radio-3' 198. Thus, the routing path indicates a path "second radio 125→radio-1' 196→radio-2' 197→radio-3' 198→first radio 120". In said example, the second message is wirelessly transferred from the second radio 125 to the radio-1' 196, then from the radio-1' 196 to the radio-2' 197, then from the radio-2' 197 to the radio-3' 198, and finally from the radio-3' 198 to the first radio 120.

Further, the second set of radios 195 is configured to communicate the second message wirelessly from the second radio 125 to the first radio 120 via the second wireless communication channel. Finally, the first communication device 110 receives the second message from the first radio 120 via the wireline.

Any features of embodiment 15 may be readily combined or permuted with any of the other embodiments 10, 11, 12, 13, 14, 16, 20, 21, 22, 23, 24, 25, 26, 30, 31, 32, 33, 34, 35, and/or 36 in accordance with the invention.

Figure 1G:
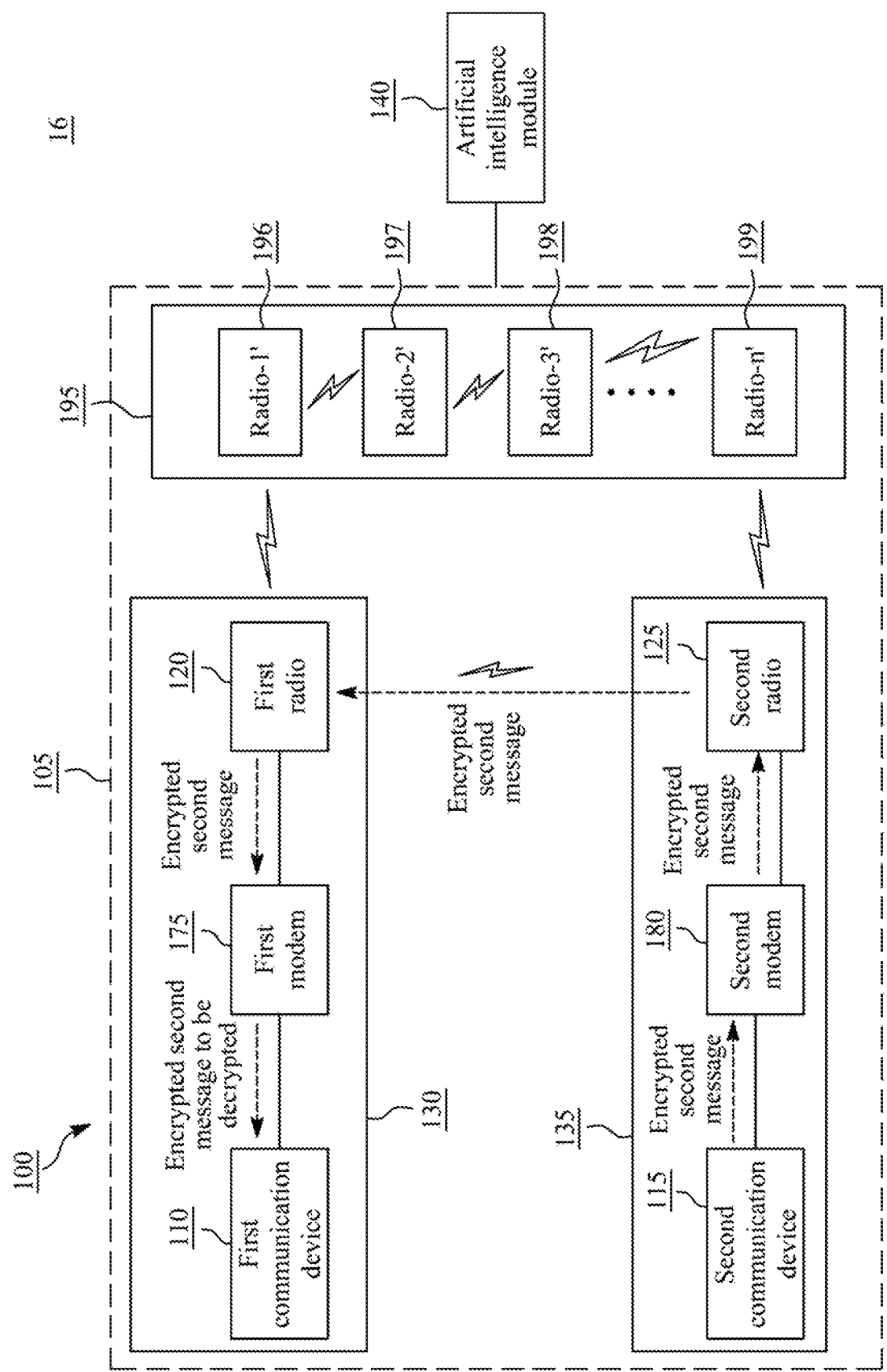
FIG. 1G demonstrates an embodiment 16 of a more elaborate communication system comprising the second communication device and the first communication device for encryption and decryption of the second message, respectively, in accordance with the invention as a block diagram.

FIG. 1G demonstrates an embodiment 16 of a more elaborate communication system 100 comprising the second communication device 115 and the first communication device 110 for encryption and decryption of the second message, respectively, in accordance with the invention as a block diagram.

In operation, when the user B of the second communication device 115 types and forwards the second message, the second communication device 115 receives the second message via the wire encrypts it into an unreadable form. Further, the second communication device 115 communicates the encrypted second message to the second radio 125 via the wireline. On receiving the encrypted second message, the second radio 125 communicates the encrypted second message wirelessly to the first radio 120. As described earlier, since there is no direct connection between the first radio 120 and the second radio 125, the encrypted second message is wirelessly communicated to the first radio 120 via the second wireless communication channel established by the second set of radios 195.

Upon receiving the encrypted second message, the first radio 120 communicates the encrypted second message to the first communication device 110 via the wireline and through the modem. The first communication device 110 decrypts the encrypted second message into a readable format.

Any features of embodiment 16 may be readily combined or permuted with any of the other embodiments 10, 11, 12, 13, 14, 15, 20, 21, 22, 23, 24, 25, 26, 30, 31, 32, 33, 34, 35, and/or 36 in accordance with the invention.

Figure 2A:
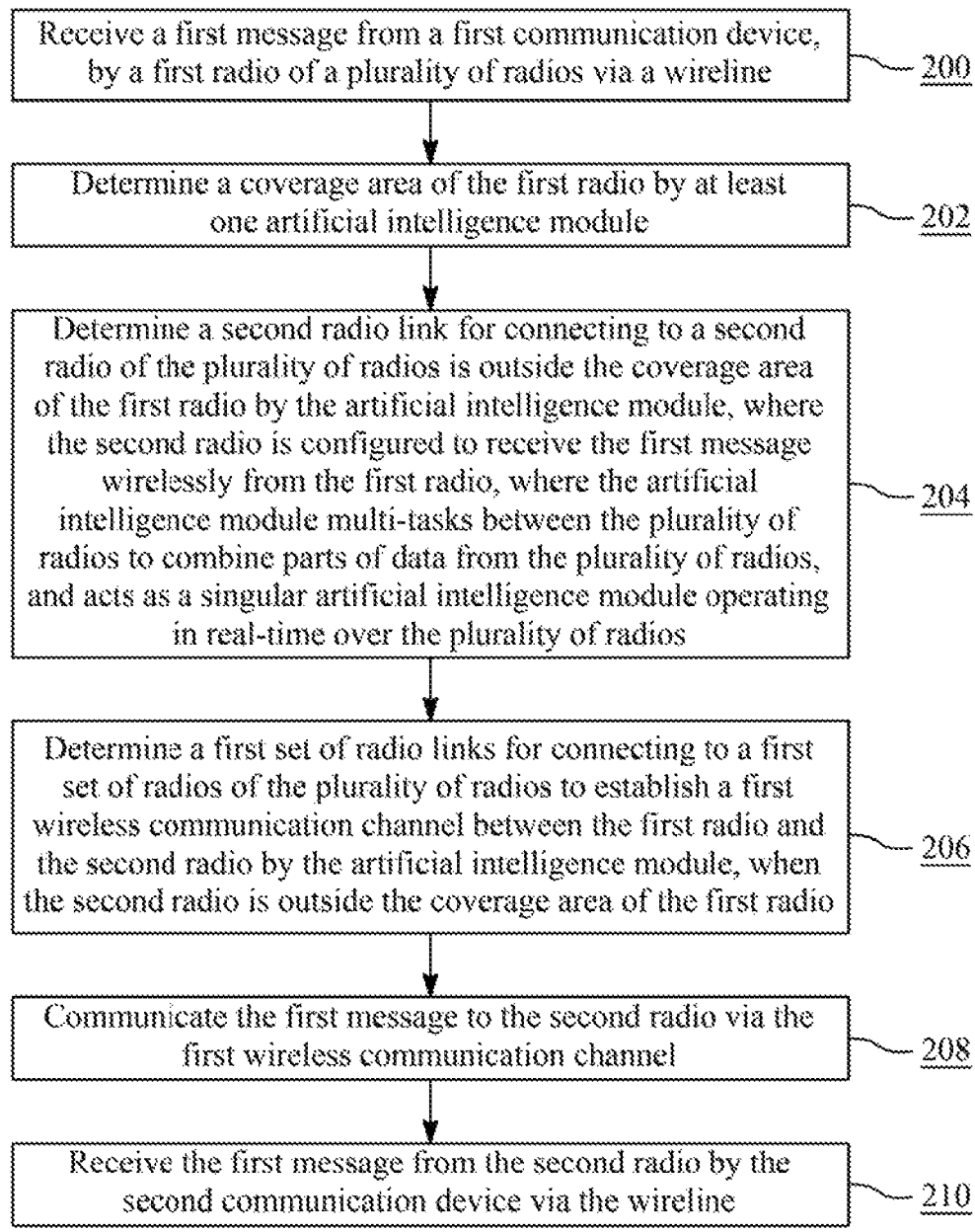
FIG. 2A demonstrates an embodiment 20 of a method for communicating a first message from a first communication device to a second communication device, in accordance with the invention as a flow diagram.

FIG. 2A demonstrates an embodiment 20 of a method for communicating a first message from a first communication device 110 to a second communication device 115, in accordance with the invention as a flow diagram. The method could be implemented in a system identical or similar to embodiments 10-16 in FIGS. 1A-1G for example, as discussed in the other parts of the description. An end-user of the method could use a user interface identical or similar to that disclosed with embodiments 30-36 in FIGS. 3A-3G.

In phase 200, a first radio 120 of a plurality of radios receives a first message from the first communication device 110 via a wireline. In an example, the first message may be a text message of up to 400 characters, and preferably less than 150 characters.

In phase 202, the artificial intelligence module 140 determines a coverage area of the first radio 120. A coverage area of a radio may be understood as a geographical distance within which the radio can communicate based on its broadcast power or range. In an example, the artificial intelligence module 140 may determine the coverage area to be 10 km.

In phase 204, an artificial intelligence module 140 determines radio links for connecting to a second radio 125 of the plurality of radios is outside the coverage area of the first radio 120. The second radio 125 receives the first message wirelessly from the first radio 120. Further, the artificial intelligence module 140 multi-tasks between the plurality of radios to combine parts of data from the plurality of radios. The artificial intelligence module 140 acts as a singular artificial intelligence module 140 operating in real-time over the plurality of radios.

In phase 206, the artificial intelligence module 140 determines a first set of radio links for connecting to a first set of radios 145 of the plurality of radios to establish a first wireless communication channel between the first radio 120 and the second radio 125 by the artificial intelligence module 140, when the second radio 125 is outside the coverage area of the first radio 120. The first wireless communication channel is indicative of a routing path for transmission of the first message from the first radio 120 to the second radio 125.

In phase 208, the first set of radios 145 communicates the first message to the second radio 125 via the first wireless communication channel. The first message wirelessly hops (that is: is first received and then transmitted further) from one radio to another radio of the first set of radios 145 until the first message reaches the second radio 125. At each hop, routing data can be added to the first message to help AI modules better determine the network status and coverage areas.

In phase 210, the second communication device 115 receives the first message from the second radio 125 via the wireline.

Any features of embodiment 20 may be readily combined or permuted with any of the other embodiments 10, 11, 12, 13, 14, 15, 16, 21, 22, 23, 24, 25, 26, 30, 31, 32, 33, 34, 35, and/or 36 in accordance with the invention.

Figure 2B:
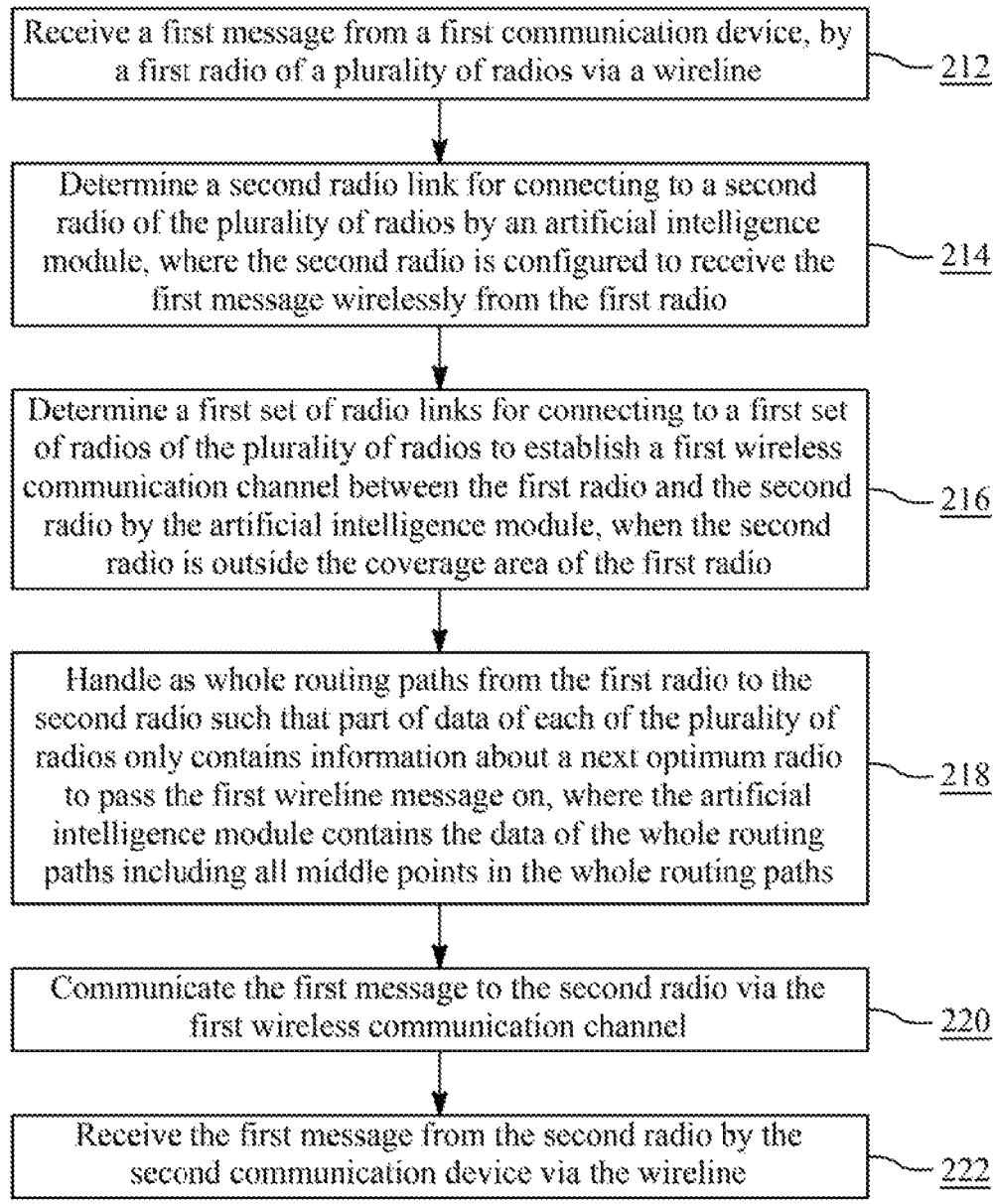
FIG. 2B demonstrates an embodiment 21 of a method for handling routing paths between a plurality of radios for communicating the first message from the first communication device to the second communication device, in accordance with the invention as a flow diagram.

FIG. 2B demonstrates an embodiment 21 of a method for handling routing paths between a plurality of radios for communicating the first message from the first communication device 110 to the second communication device 115, in accordance with the invention as a flow diagram. The method could be implemented in a system identical or similar to embodiments 10-16 in FIGS. 1A-1G for example, as discussed in the other parts of the description. An end-user of the method could use a user interface identical or similar to that disclosed with embodiments 30-36 in FIGS. 3A-3G.

In phase 212, the first radio 120 of the plurality of radios receives the first message from the first communication device 110 via the wireline. In an example, a radio may be a walkie talkie, a commercial radio, a military radio, a taxi radio, and the like.

In phase 214, the artificial intelligence module 140 determines that the second radio 125 of the plurality of radios is outside the coverage area of the first radio 120. The second radio 125 is configured to receive the first message wirelessly from the first radio 120.

In phase 216, the artificial intelligence module 140 determines the set of radio links for connecting the first set of radios 145 of the plurality of radios to establish the first wireless communication channel between the first radio 120 and the second radio 125 by the artificial intelligence module 140, when the second radio 125 is outside the coverage area of the first radio 120.

In phase 218, the artificial intelligence module 140 handles as a whole routing paths from the first radio 120 to the second radio 125 such that part of data of each of the plurality of radios only contains information about a next optimum radio to pass the first message on. In an example, the artificial intelligence module 140 includes data of the whole routing paths including all middle points in the whole routing paths.

In phase 220, the first set of radios 145 communicates the first message to the second radio 125 via the first wireless communication channel.

In phase 222, the second communication device 115 receives the first message from the second radio 125 via the wireline.

Any features of embodiment 21 may be readily combined or permuted with any of the other embodiments 10, 11, 12, 13, 14, 15, 16, 20, 22, 23, 24, 25, 26, 30, 31, 32, 33, 34, 35, and/or 36 in accordance with the invention.

Figure 2C:
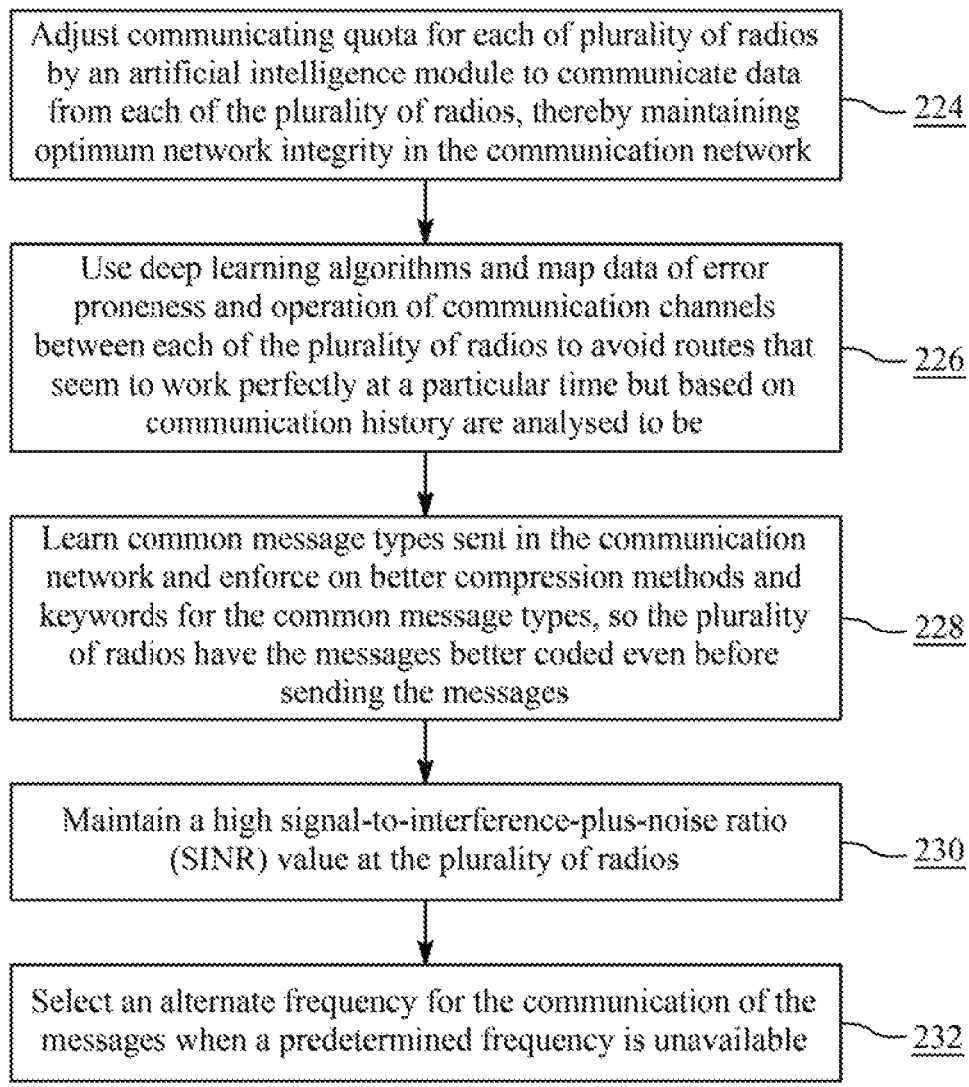
FIG. 2C demonstrates an embodiment 22 of a method for using a deep learning data file for communicating the first message from the first communication device to the second communication device, in accordance with the invention as a flow diagram.

FIG. 2C demonstrates an embodiment 22 of a method for using a deep learning data file for communicating the first message from the first communication device 110 to the second communication device 115, in accordance with the invention as a flow diagram. The method could be implemented in a system identical or similar to embodiments 10-16 in FIGS. 1A-1G for example, as discussed in the other parts of the description. An end-user of the method could use a user interface identical or similar to that disclosed with embodiments 30-36 in FIGS. 3A-3G.

In phase 224, the artificial intelligence module 140 adjusts communicating quota for each of the plurality of radios for communication of data from each of the plurality of radios. In an example, the artificial intelligence module 140 adjusts the communicating quota for the radios to maintain optimum network integrity in the communication network 105. A communicating quota for a radio may be indicative of a right to use radio channel for that radio. In one example, the artificial intelligence module 140 minimizes the data transmission channel capacity for each radio to a practical minimum in relation to the capacity needed for the communication of the first message. Accordingly, risk of rogue data, for example, unauthorized spyware data, being added to data or message stream is minimized.

In phase 226, the artificial intelligence module 140 uses deep learning algorithms and map data of error proneness and operation of communication channels between each radio to avoid routes that seem to work perfectly at a particular time but based on communication history are analyzed to be unreliable in different critical situations. In an example, the critical situations include at least one of a high channel load, a particular date, a particular daytime, particular user interface usage, a particular battery voltage, a particular environment light, particular global positioning system (GPS) coordinates, and particular motion states of the plurality of radios determined by a motion sensor (s).

In phase 228, the artificial intelligence module 140 learns common message types sent in the communication network 105 and enforces on better compression methods and keywords for the common message types. In this way, the radios have the messages better coded even before sending the messages. In an example, the messages are zipped or compressed using uniquely effective algorithm with vocabularies of various languages, whereas the the word count and data size of vocabularies are decreased or increased based on the previous usage frequency of different words within messages. Any new language can also be easily added.

In phase 230, the artificial intelligence module 140 maintains a high signal-to-interference-plus-noise ratio (SINR) value at the plurality of radios.

In phase 232, the artificial intelligence module 140, for each radio, selects an alternate frequency for the communication of the messages when a predetermined frequency is unavailable. In an example, if some of the frequencies are jammed, the artificial intelligence module 140 may select another frequency in the communication network 105 for communication of messages.

Any features of embodiment 22 may be readily combined or permuted with any of the other embodiments 10, 11, 12, 13, 14, 15, 16, 20, 21, 23, 24, 25, 26, 30, 31, 32, 33, 34, 35, and/or 36 in accordance with the invention.

Figure 2D:
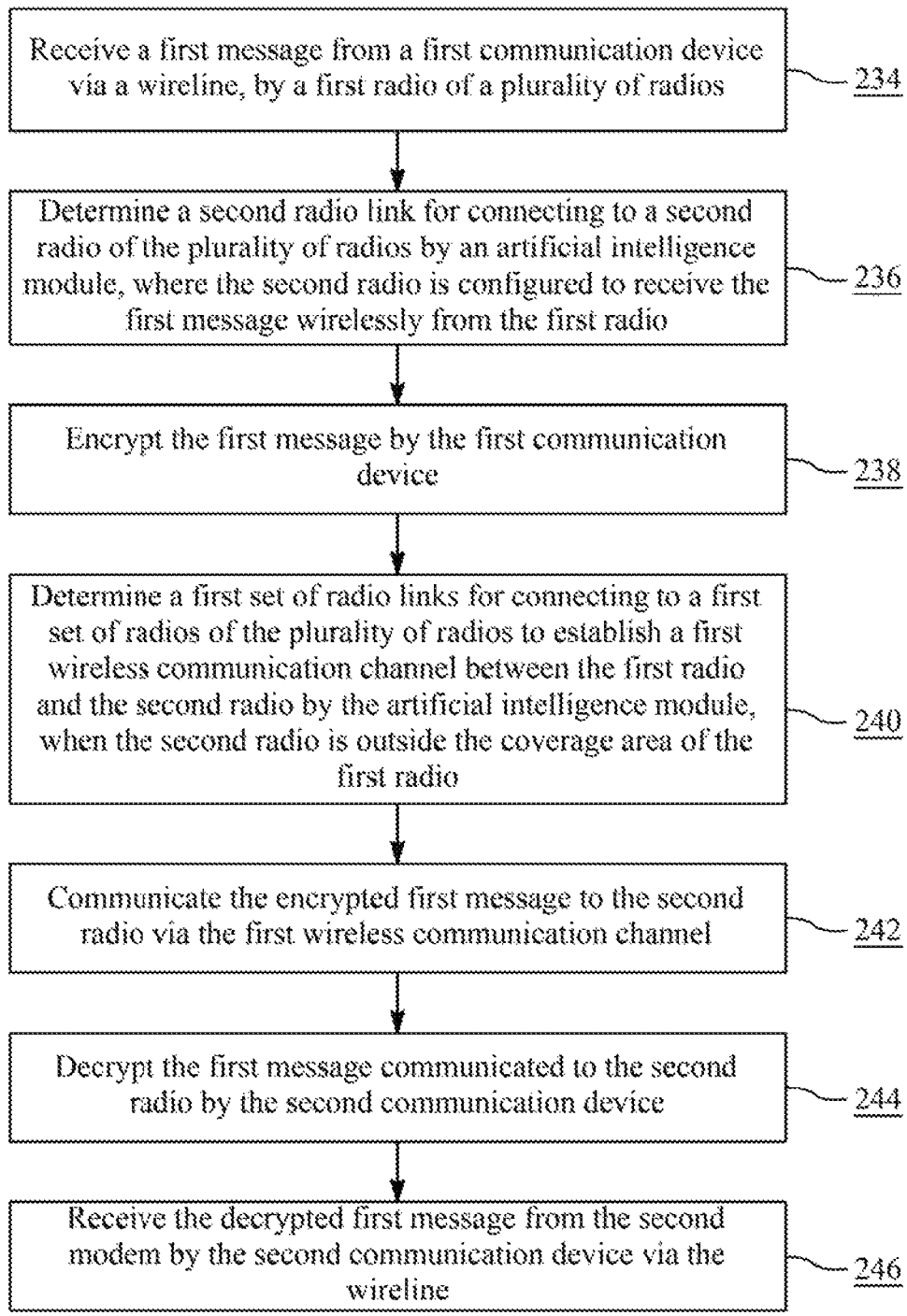
FIG. 2D demonstrates an embodiment 23 of a method for encryption of the first message received from the first communication device and decryption of the first message communicated to the second communication device, in accordance with the invention as a flow diagram.

FIG. 2D demonstrates an embodiment 23 of a method for encryption of the first message received from the first communication device 110 and decryption of the first message communicated to the second communication device 115, in accordance with the invention as a flow diagram. The method could be implemented in a system identical or similar to embodiments 10-16 in FIGS. 1A-1G for example, as discussed in the other parts of the description. An end-user of the method could use a user interface identical or similar to that disclosed with embodiments 30-36 in FIGS. 3A-3G.

In phase 234, the first radio 120 of the plurality of radios receives the first message from the first communication device 110 via a wireline.

In phase 236, the artificial intelligence module 140 determines the radio links for connecting to the second radio 125 of the plurality of radios is outside the coverage area of the first radio 120. The second radio 125 is configured to receive the first message from the first radio 120.

In phase 238, a first communication device 110 encrypts the first message that is received via the wireline. The first communication device 110 encrypts the first message in such a way that only intended recipient can read it.

In phase 240, the artificial intelligence module 140 determines the first set of radio links for connecting to the first set of radios 145 of the plurality of radios to establish the first wireless communication channel between the first radio 120 and the second radio 125 by the artificial intelligence module 140, when the second radio 125 is outside the coverage area of the first radio 120.

In phase 242, the first set of radios 145 communicates the first message to the second radio 125 via the first wireless communication channel. As described earlier, since there is no direct connection between the first radio 120 and the second radio 125, the encrypted first message is wirelessly communicated to the second radio 125 via the first wireless communication channel established by the first set of radios 145.

In phase 244, a second communication device 115 decrypts the first message communicated to the second radio 125 via the wireline. The second communication device 115 decrypts the encrypted first message into a readable format.

Any features of embodiment 23 may be readily combined or permuted with any of the other embodiments 10, 11, 12, 13, 14, 15, 16, 20, 21, 22, 24, 25, 26, 30, 31, 32, 33, 34, 35, and/or 36 in accordance with the invention.

Figure 2E:
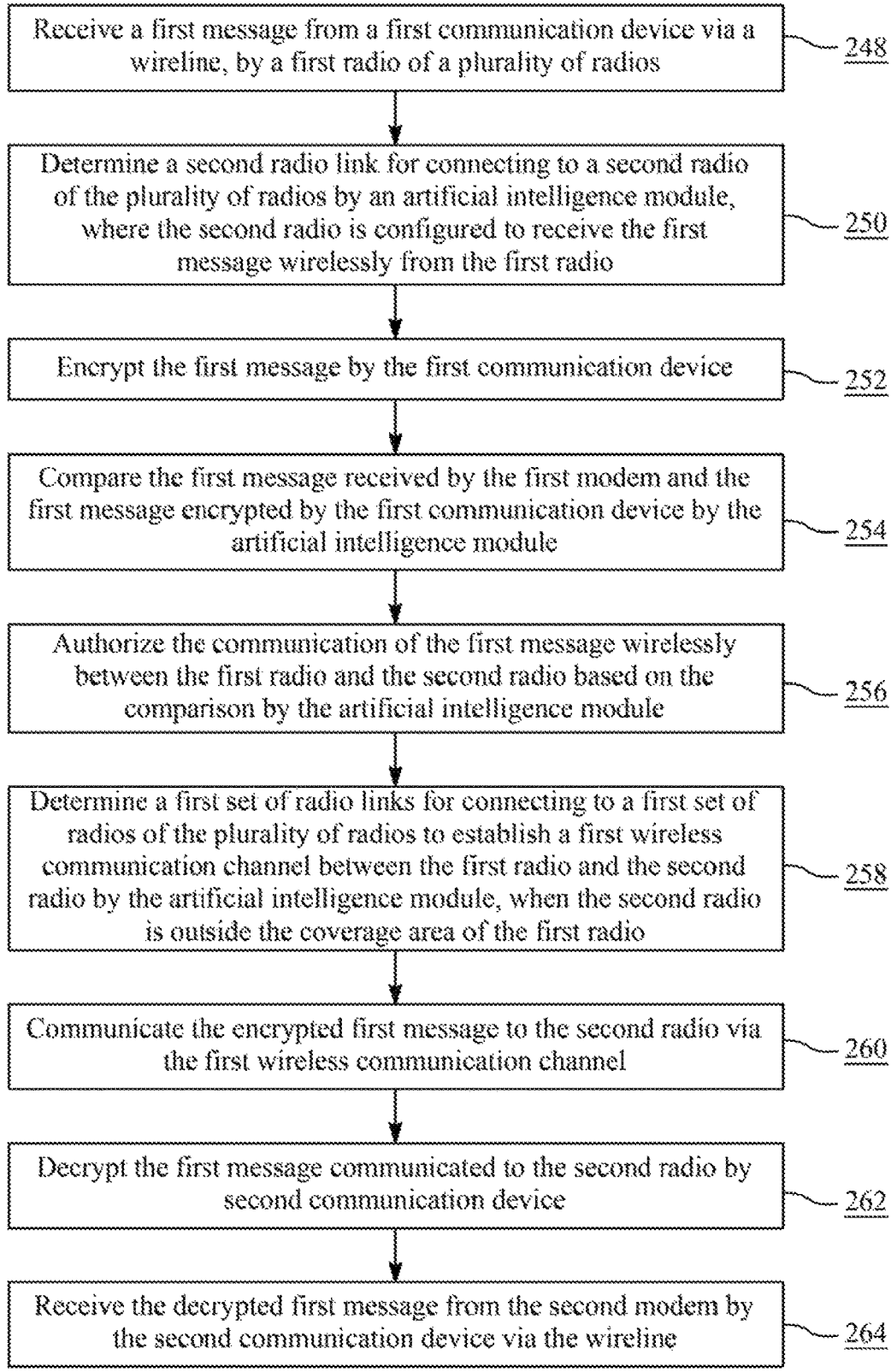
FIG. 2E demonstrates an embodiment 24 of a method for authorizing the communication of the first message between the first communication device and the second communication device, in accordance with the invention as a flow diagram.

FIG. 2E demonstrates an embodiment 24 of a method for authorizing the communication of the first message between the first communication device 110 and the second communication device 115, in accordance with the invention as a flow diagram. The method could be implemented in a system identical or similar to embodiments 10-16 in FIGS. 1A-1G for example, as discussed in the other parts of the description. An end-user of the method could use a user interface identical or similar to that disclosed with embodiments 30-36 in FIGS. 3A-3G.

In phase 248, the first radio 120 of the plurality of radios receives the first message from the first communication device 110.

In phase 250, the artificial intelligence module 140 determines the radio link for connecting to the second radio 125 of the plurality of radios, outside the coverage area of the first radio 120. The second radio 125 is configured to receive the first message from the first radio 120.

In phase 252, the first communication device 110 encrypts the first message.

In phase 254, the artificial intelligence module 140 compares the first message received and encrypted by the first communication device 110. In an example, the artificial intelligence module 140 compares the first message received and encrypted by the first communication device 110 to check for any discrepancy.

In phase 256, the artificial intelligence module 140 authorizes the communication of the first message wirelessly between the first radio 120 and the second radio 125 based on the comparison. For instance, if no discrepancy is found in the comparison results, the artificial intelligence module 140 authorizes the communication of the first message between the first radio 120 and the second radio 125.

In phase 258, the artificial intelligence module 140 determines the first set of radio links 145 of the plurality of radios to establish the first wireless communication channel between the first radio 120 and the second radio 125 by the artificial intelligence module 140, when the second radio 125 is outside the coverage area of the first radio 120.

In phase 260, the first set of radios 145 communicates the encrypted first message to the second radio 125 via the first wireless communication channel.

In phase 262, the second communication device 115 decrypts the first message communicated to the second radio 125.

In phase 264, the second communication device 115 receives the decrypted first message from the second modem 180 via the wireline.

In some embodiments the encryption and decryption can be performed by the modems or the communication devices, or parts of the encryption and/or decryption process can be distributed between the modem and the communication device in either the sending or receiving end.

Any features of embodiment 24 may be readily combined or permuted with any of the other embodiments 10, 11, 12, 13, 14, 15, 16, 20, 21, 22, 23, 25, 26, 30, 31, 32, 33, 34, 35, and/or 36 in accordance with the invention.

Figure 2F:
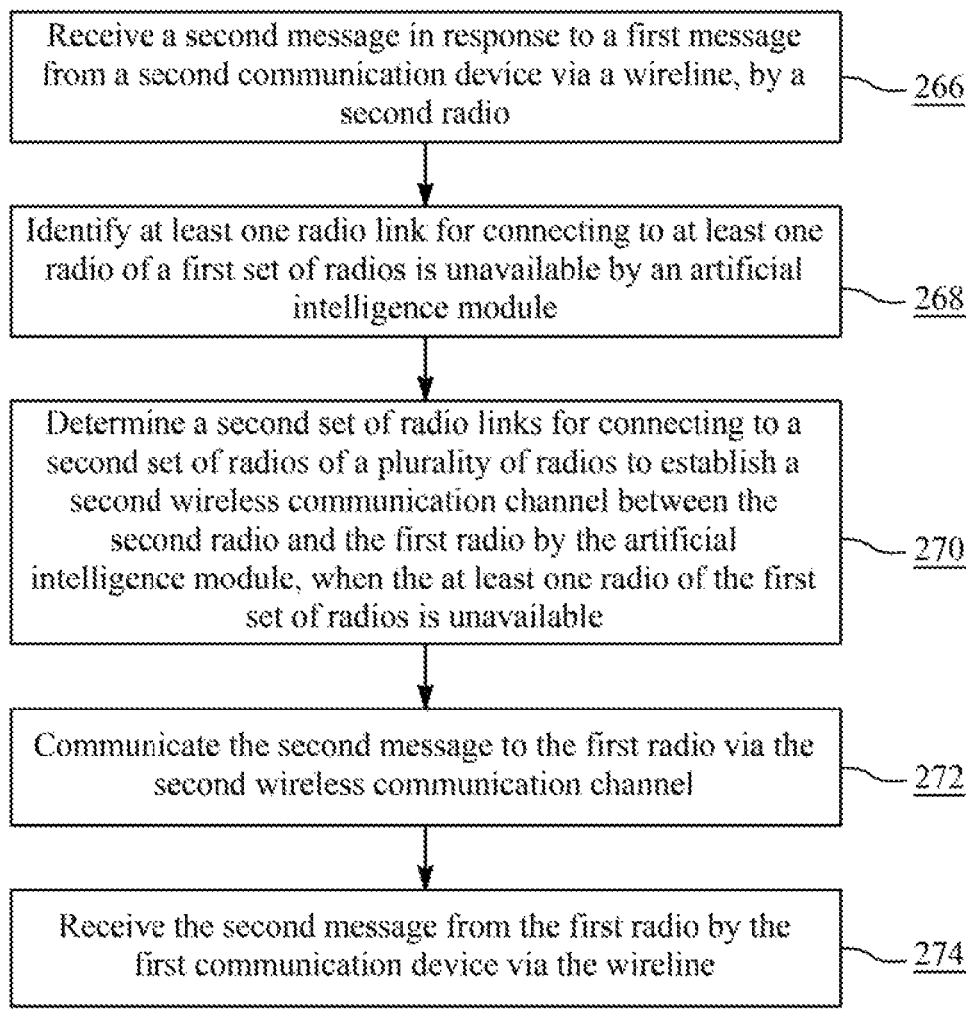
FIG. 2F demonstrates an embodiment 25 of a method for communicating a second message in response to the first message from the second communication device to the first communication device, in accordance with the invention as a flow diagram.

FIG. 2F demonstrates an embodiment 25 of a method for communicating a second message in response to the first message from the second communication device 115 to the first communication device 110, in accordance with the invention as a flow diagram. The method could be implemented in a system identical or similar to embodiments 10-16 in FIGS. 1A-1G for example, as discussed in the other parts of the description. An end-user of the method could use a user interface identical or similar to that disclosed with embodiments 30-36 in FIGS. 3A-3G.

In phase 266, the second radio 125 receives a second message in response to the first message from the second communication device 115 via the wireline. In an example, the second message may be an acknowledgement message to the first message.

In phase 268, the artificial intelligence module 140 identifies that at least one radio link of the first set of radios 145 is unavailable. For example, when a radio is out of order, then the radio is said to be unavailable.

In phase 270, the artificial intelligence module 140 determines a second set of radio links for connecting to a second set of radios 195 to establish a second wireless communication channel between the second radio 125 and the first radio 120, when the at least one radio of the first set of radios 145 is unavailable. The second set of radios 195 does not include those radios of the first set of radios 145 that are identified as unavailable.

In phase 272, the second set of radios 195 communicates the second message to the first radio 120 via the second wireless communication channel.

In phase 274, the first communication device 110 receives the second message from the first radio 120 via the wireline.

Any features of embodiment 25 may be readily combined or permuted with any of the other embodiments 10, 11, 12, 13, 14, 15, 16, 20, 21, 22, 23, 24, 26, 30, 31, 32, 33, 34, 35, and/or 36 in accordance with the invention.

Figure 2G:
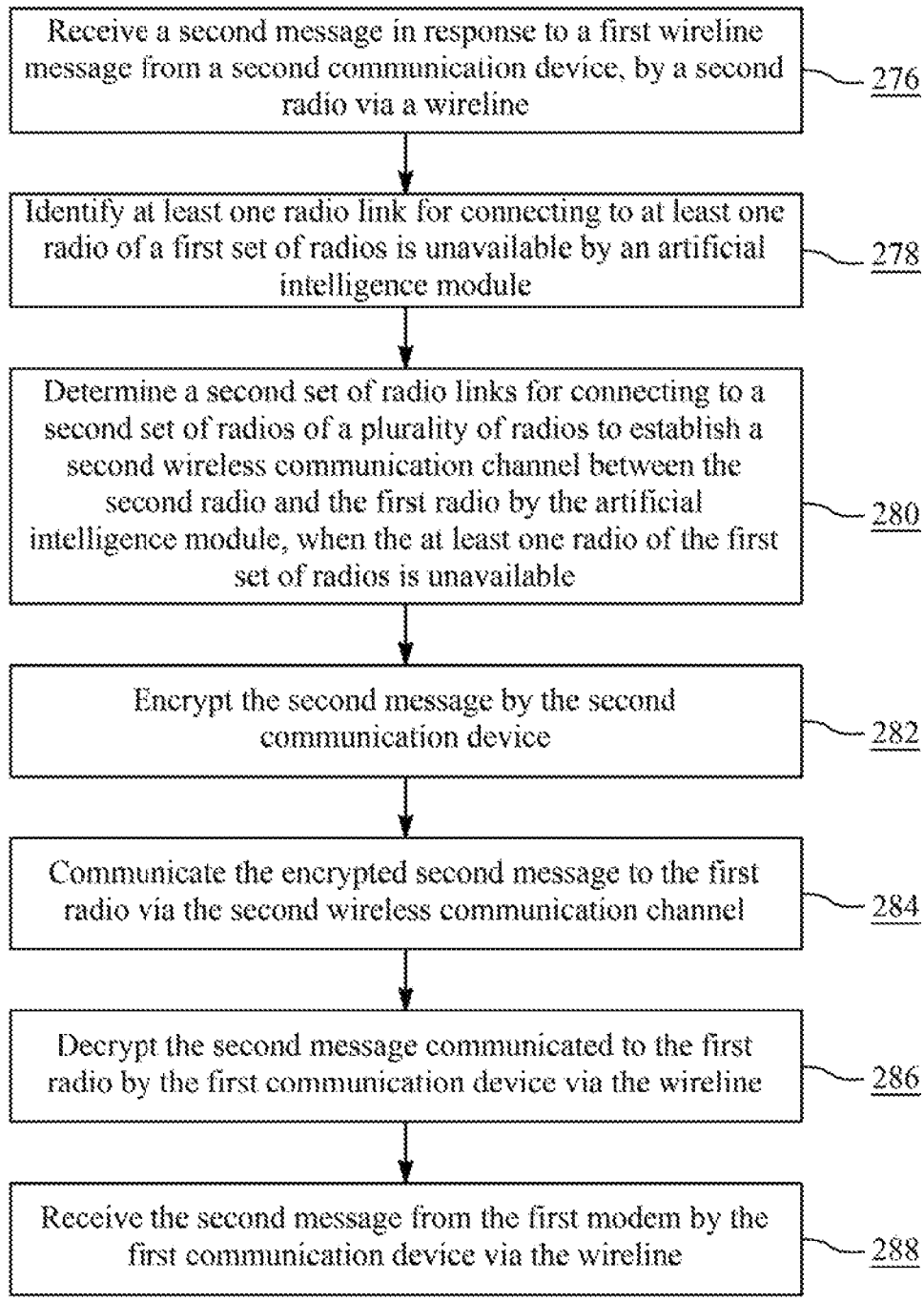
FIG. 2G demonstrates an embodiment 26 of a method for encryption of the second message received from the second communication device and decryption of the second message communicated to the first communication device, in accordance with the invention as a flow diagram.

FIG. 2G demonstrates an embodiment 26 of a method for encryption of the second message received from the second communication device 115 and decryption of the second message communicated to the first communication device 110, in accordance with the invention as a flow diagram. The method could be implemented in a system identical or similar to embodiments 10-16 in FIGS. 1A-1G for example, as discussed in the other parts of the description. An end-user of the method could use a user interface identical or similar to that disclosed with embodiments 30-36 in FIGS. 3A-3G.

In phase 276, the second radio 125 receives the second message in response to the first message from the second communication device 115.

In phase 278, the artificial intelligence module 140 identifies that at least one radio link of the first set of radios 145 is unavailable.

In phase 280, the artificial intelligence module 140 determines the second set of radio links of the second set of radios 195 to establish the second wireless communication channel between the second radio 125 and the first radio 120, when the at least one radio of the first set of radios 145 is unavailable.

In phase 282, the second communication device 115 encrypts the second message.

In phase 284, the second set of radios 195 communicates the encrypted second message to the first radio 120 via the second wireless communication channel.

In phase 286, the first communication device 110 decrypts the second message communicated to the first radio 120.

Optionally in phase 288, the first communication device 110 receives the second message from the first modem 175 via the wireline, in the alternative that the decryption is done by the first modem 175.

Any features of embodiment 26 may be readily combined or permuted with any of the other embodiments 10, 11, 12, 13, 14, 15, 16, 20, 21, 22, 23, 24, 25, 30, 31, 32, 33, 34, 35, and/or 36 in accordance with the invention.

Figure 3A:
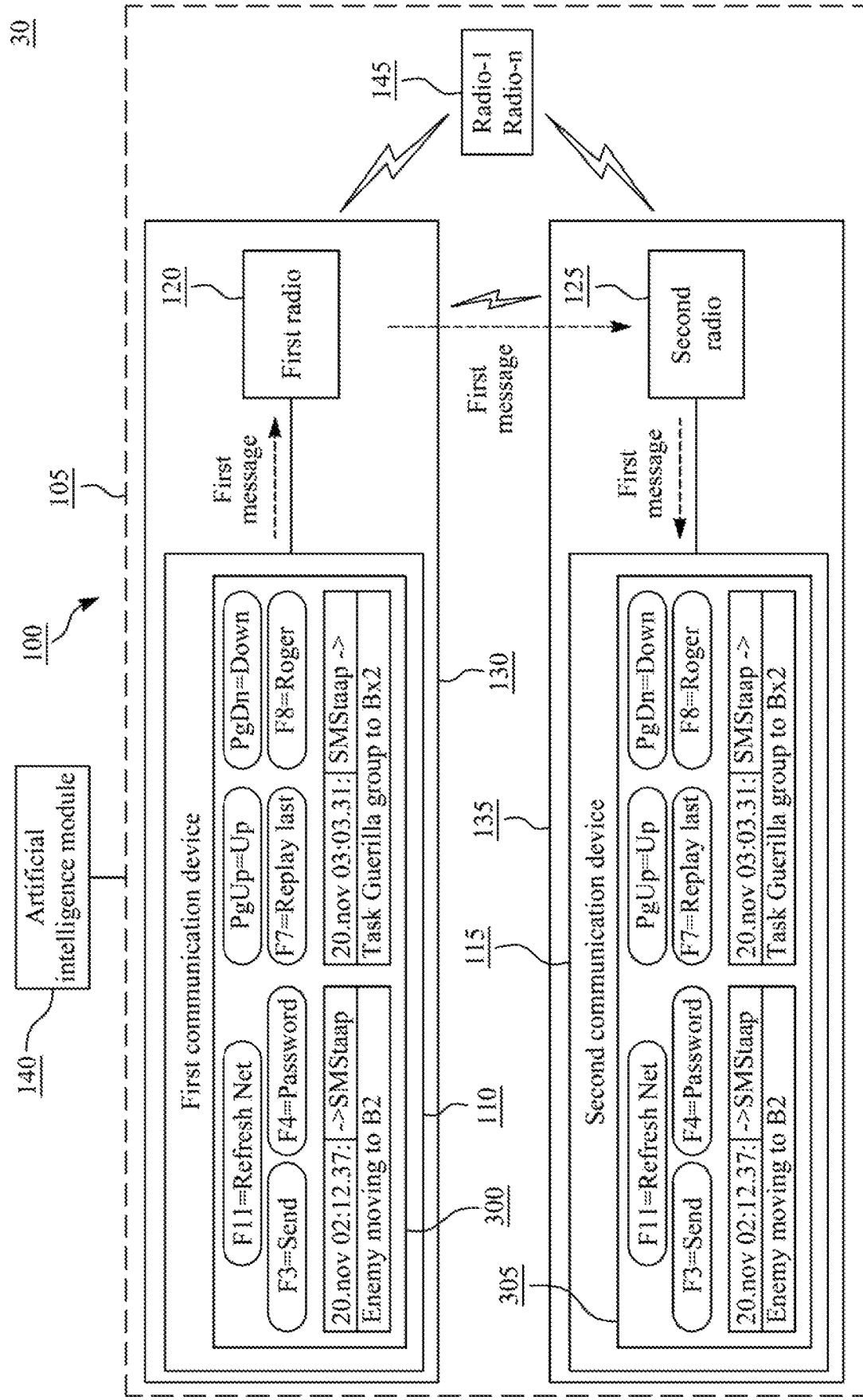
FIG. 3A demonstrates an embodiment 30 of software program product user interfaces showing communication of a first message in a communication network, in accordance with the invention as a screen shot diagram.

FIG. 3A demonstrates an embodiment 30 of software program product user interfaces 300 and 305 showing communication of a first message in a communication network 105, in accordance with the invention as a screen shot diagram. This could be for example the screen of a smartphone. The system behind the user interfaces could be e.g. embodiments 10, 11, 12, 13, 14, 15, and 16 explained earlier.

According to an embodiment, the first communication device 110 may display a user interface 300 and the second communication device 115 may display a user interface 305.

The messaging computer software program product is stored in a memory medium either on the communication device or on the network, or distributed between the two, so that some parts reside on the communication device and some parts of the software program product reside on the network.

The software program product is operable with the first communication device 110 and/or second communication device 115, and also via the communication network 105. Typically, each of the first communication device 110 and the second communication device 115 is configured to have an application installed that allows a user to create and send communication messages, and the user interfaces 300 and 305 could be the user interfaces of the aforementioned applications.

Preferably, the user interfaces 300 and 305 are configured to receive messages created by users of the first communication device 110 and the second communication device 115.

In operation, when a user of the first communication device 110, for example user A, wishes to communicate with a user of the second communication device 115, for example, user B, the user A may create and send a message to the user B using the user interface 300. In one example, as shown on the user interface 300, the user A may send a message "Enemy moving to B2" to the user B. Once the user A types the first message, the first radio 120 may receive the first message from the first communication device 110 via a wireline to be sent to the second radio 125.

Further, the artificial intelligence module 140 determines radio links for connecting a first set of radios 145 that are situated between the first radio 120 and the second radio 125 as relay stations for transmission of the first message wirelessly from the first radio 120 to the second radio 125. The first set of radios 145 communicates the first message to the second radio 125 via the first wireless communication channel. The second radio 125 receives the first message and forwards it to the second communication device 115 via the wireline. Finally, the user B receives the first message from the second radio 125 on the user interface 305 of the second communication device 115.

The artificial intelligence module 140 may be distributed over the network on a peer-to-peer basis, it may reside on a separate network server and/or it may have an architecture where it has a central server or central servers that co-ordinates the network of client software applications installed in the individual terminal devices.

Any features of embodiment 30 may be readily combined or permuted with any of the other embodiments 10, 11, 12, 13, 14, 15, 16, 20, 21, 22, 23, 24, 25, 26, 31, 32, 33, 34, 35, and/or 36 in accordance with the invention.

Figure 3B:
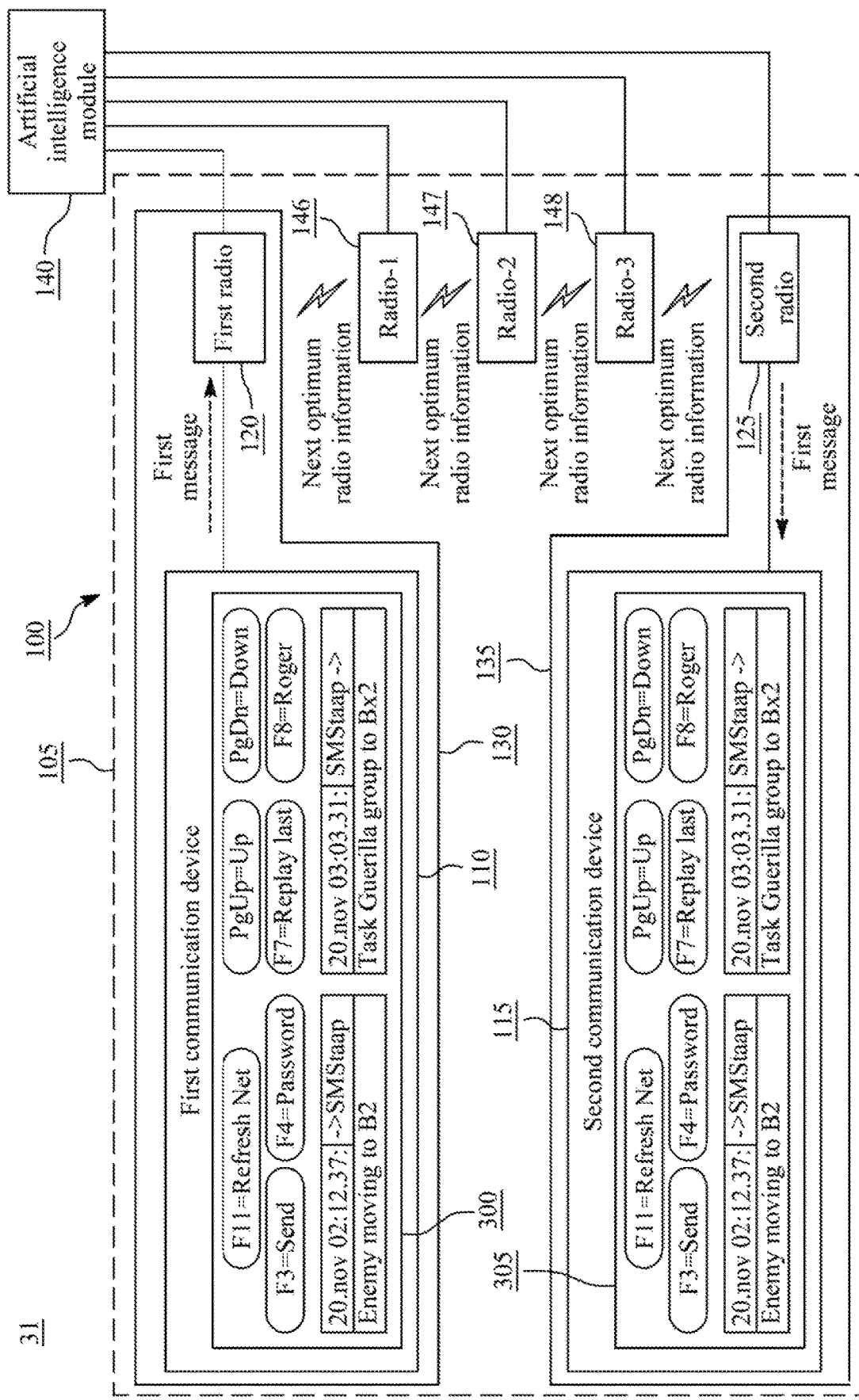
FIG. 3B demonstrates an embodiment 31 of the software program product user interfaces showing handling of routing paths between plurality of radios, in accordance with the invention as a screen shot diagram.

FIG. 3B demonstrates an embodiment 31 of the software program product user interfaces 300 and 305 showing handling of routing paths between plurality of radios, in accordance with the invention as a screen shot diagram. This could be for example the screen of a tablet computer. The system behind the user interfaces could be e.g. embodiments 10, 11, 12, 13, 14, 15, and 16 explained earlier.

According to an embodiment, once the user A of the first communication device 110 communicates the first message to the user B of the second communication device 115 through the user interface 300, the artificial intelligence module 140 determines the first set of radio links for connecting the first set of radios 145 to communicate the first message from the first radio 120 to the second radio 125 via the first wireless communication channel established by the first set of radios 145.

According to an embodiment, the artificial intelligence module 140 handles whole routing paths from the first radio 120 to the second radio 125 such that part of data of each of the first set of radios 145 includes information related to only next optimum radio to pass on the first message. In an example, the artificial intelligence module 140 comprises data of the whole routing paths including all middle points in the whole routing paths.

Any features of embodiment 31 may be readily combined or permuted with any of the other embodiments 10, 11, 12, 13, 14, 15, 16, 20, 21, 22, 23, 24, 25, 26, 30, 32, 33, 34, 35, and/or 36 in accordance with the invention.

Figure 3C:
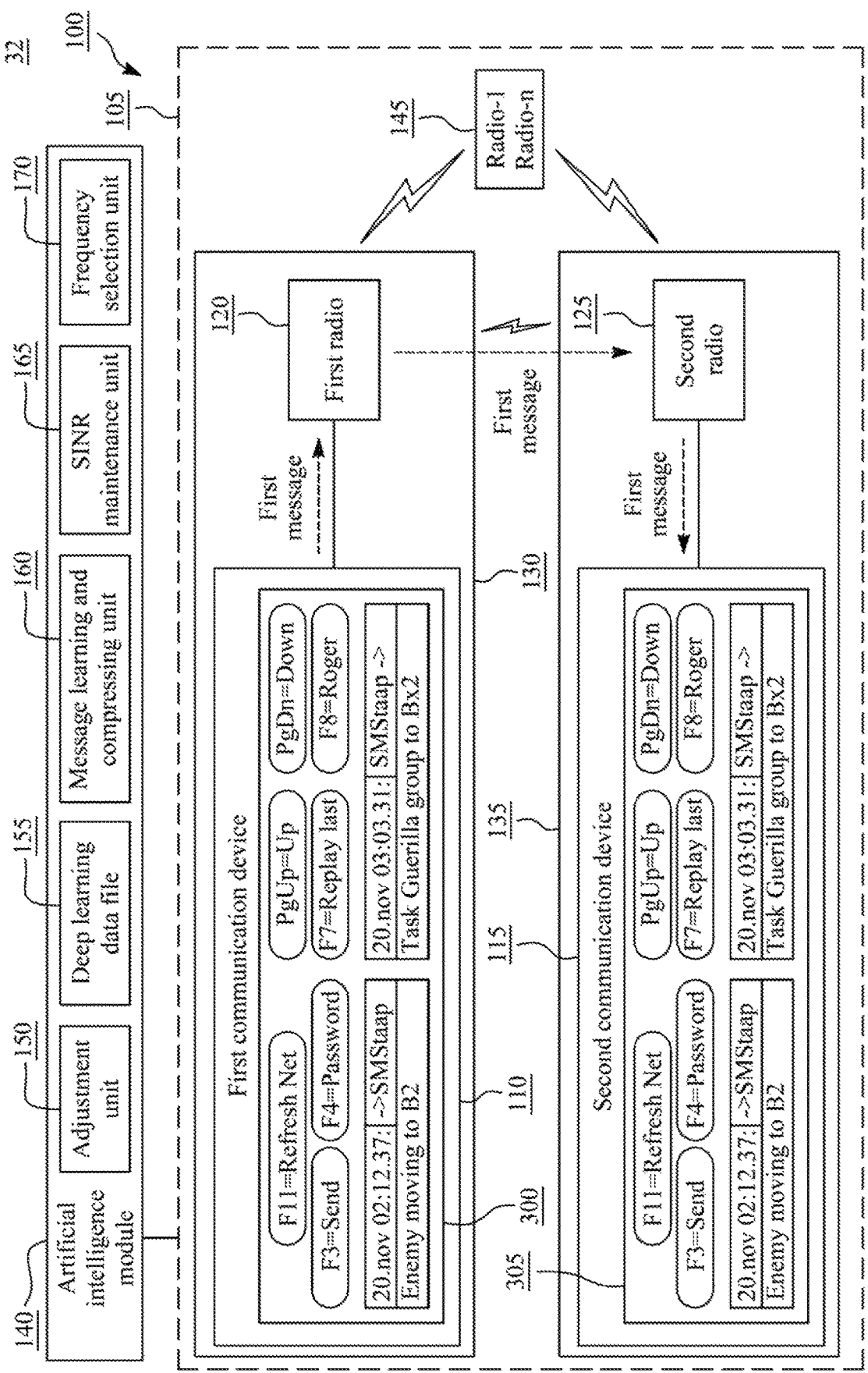
FIG. 3C demonstrates an embodiment 32 of the of the software program product user interfaces showing an adjustment unit, a deep learning data file, message learning and compressing unit, a signal-to-interference-plus-noise ratio (SINR) maintenance unit, and a frequency selection unit, in accordance with the invention as a screen shot diagram.

FIG. 3C demonstrates an embodiment 32 of the of the software program product user interfaces 300 and 305 showing the adjustment unit 150, the deep learning data file 155, the message learning and compressing unit 160, the SINR maintenance unit 165, and the frequency selection unit 170, in accordance with the invention as a screen shot diagram. This could be for example the screen of a smartphone. The system behind the user interfaces could be e.g. embodiments 10, 11, 12, 13, 14, 15, and 16 explained earlier.

According to an embodiment, the artificial intelligence module 140 comprises the adjustment unit 150 to adjust communicating quota for each radio based on its need to communicate data from each radio. Further, the artificial intelligence module 140 comprises the deep learning data file 155. In an example, the deep learning data file 155 includes deep learning algorithms. According to said example, the first message wirelessly hops from one radio to another radio of the routing path until the first message is received by the second radio 125, based on the deep learning algorithms. In other words, the first message is guided based on the deep learning algorithms. If any radio in the routing path is in a non-active state, the artificial intelligence module 140 may automatically determine another routing path for communication of the first message wirelessly to the second radio 125. Therefore, as long as there are radios in the communication network 105 and some of the radios can communicate with each other, the first message gets delivered to the second radio 125.

According to an embodiment, the artificial intelligence module 140 is configured to use deep learning algorithms and map data of error proneness and operation of communication channels between each radio to avoid routes that seem to work perfectly at a particular time, but based on communication history of the radios are analyzed to be unreliable in different critical situations. In an example, the communication history of the radios may be stored in the database. Further, examples of the critical situations in include, but are not limited to, a high channel load, a particular date, a particular daytime, particular user interface usage, a battery voltage, environment light, global positioning system (GPS) coordinates, and a motion state of the plurality of radios determined by a motion sensor.

Additionally, the artificial intelligence module 140 includes the message learning and compressing unit 160. The message learning and compressing unit 160 is configured to learn common message types sent in the communication network 105 and enforce on better compression methods and keywords for the common message types, so that the radios have the messages better coded even before sending the messages. The artificial intelligence module 140 also comprises the SINR maintenance unit 165 and the frequency selection unit 170. The SINR maintenance unit 165 is configured to maintain a high SINR value for the multiple radios. Further, the frequency selection unit 170 is configured to select, for each of the multiple of radios, an alternate frequency for the communication of the messages when a predetermined frequency is unavailable.

Any features of embodiment 32 may be readily combined or permuted with any of the other embodiments 10, 11, 12, 13, 14, 15, 16, 20, 21, 22, 23, 24, 25, 26, 30, 31, 33, 34, 35, and/or 36 in accordance with the invention.

Figure 3D:
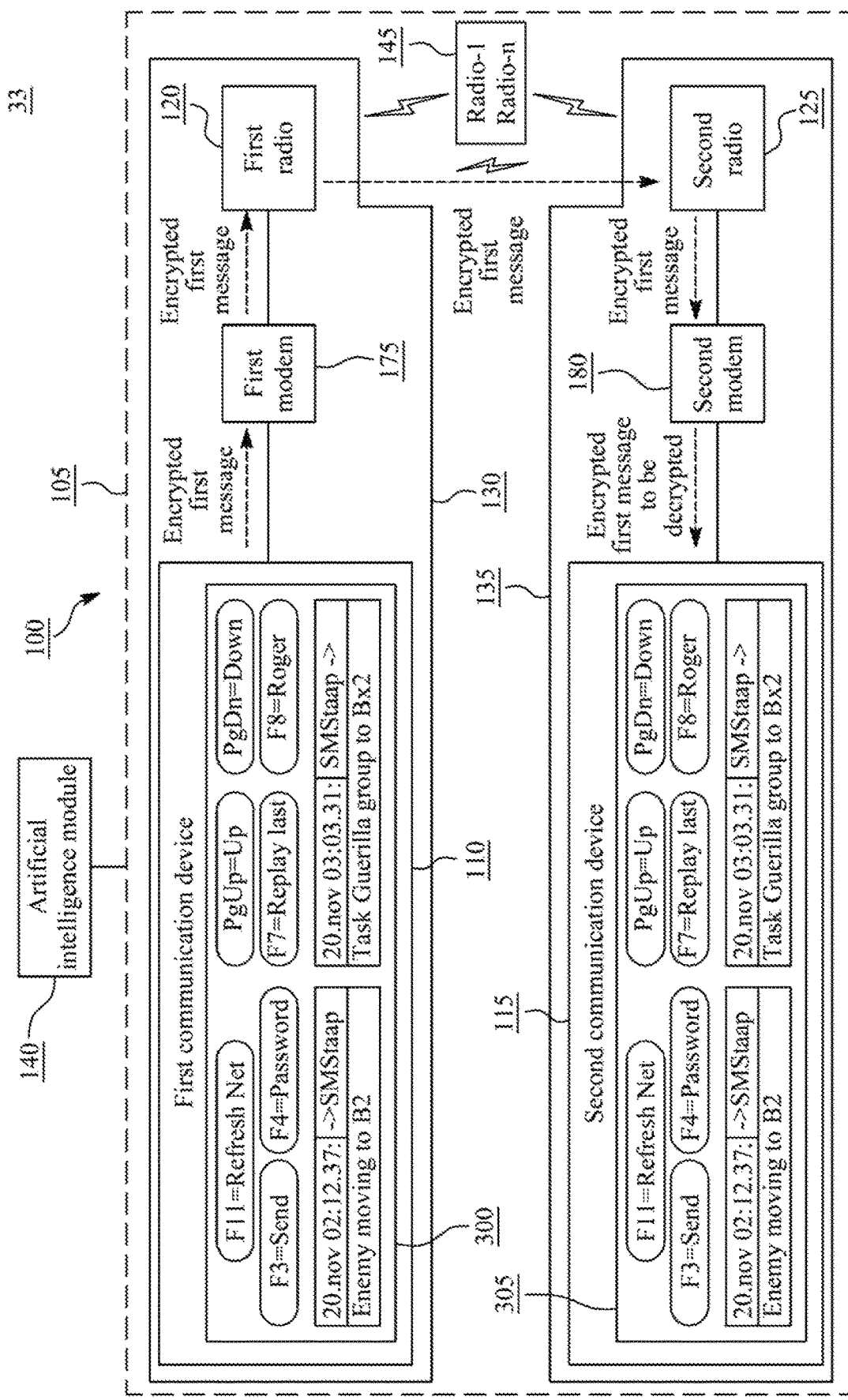
FIG. 3D demonstrates an embodiment 33 of the software program product user interfaces showing encryption and decryption of the first message by a first communication device and a second communication device, respectively, in accordance with the invention as a screen shot diagram.

FIG. 3D demonstrates an embodiment 33 of the software program product user interfaces 300 and 305 showing encryption and decryption of the first message by the first communication device 110 and the second communication device 115, respectively, in accordance with the invention as a screen shot diagram. This could be for example the screen of a smartphone. The system behind the user interfaces could be e.g. embodiments 10, 11, 12, 13, 14, 15, and 16 explained earlier.

According to an embodiment, when the user A of the first communication device 110 types the message using the user interface 300 and forwards the first message, the first message is encrypted by the first communication device 110. Further, the first modem 175 communicates the encrypted first message to the first radio 120. On receiving the encrypted first message, the first radio 120 communicates the encrypted first message to the second radio 125. As described earlier, since there is no direct connection between the first radio 120 and the second radio 125, the encrypted first message is wirelessly communicated to the second radio 125 via the first wireless communication channel established by the first set of radios 145.

Upon receiving the encrypted first message, the second radio 125 communicates the encrypted first message to the second modem 180. The second communication device 115 decrypts the encrypted first message into a readable format. Further, the second modem 180 communicates the decrypted first message to user B on the user interface 305 of the second communication device 115 via the wireline.

Any features of embodiment 33 may be readily combined or permuted with any of the other embodiments 10, 11, 12, 13, 14, 15, 16, 20, 21, 22, 23, 24, 25, 26, 30, 31, 32, 34, 35, and/or 36 in accordance with the invention.

Figure 3E:
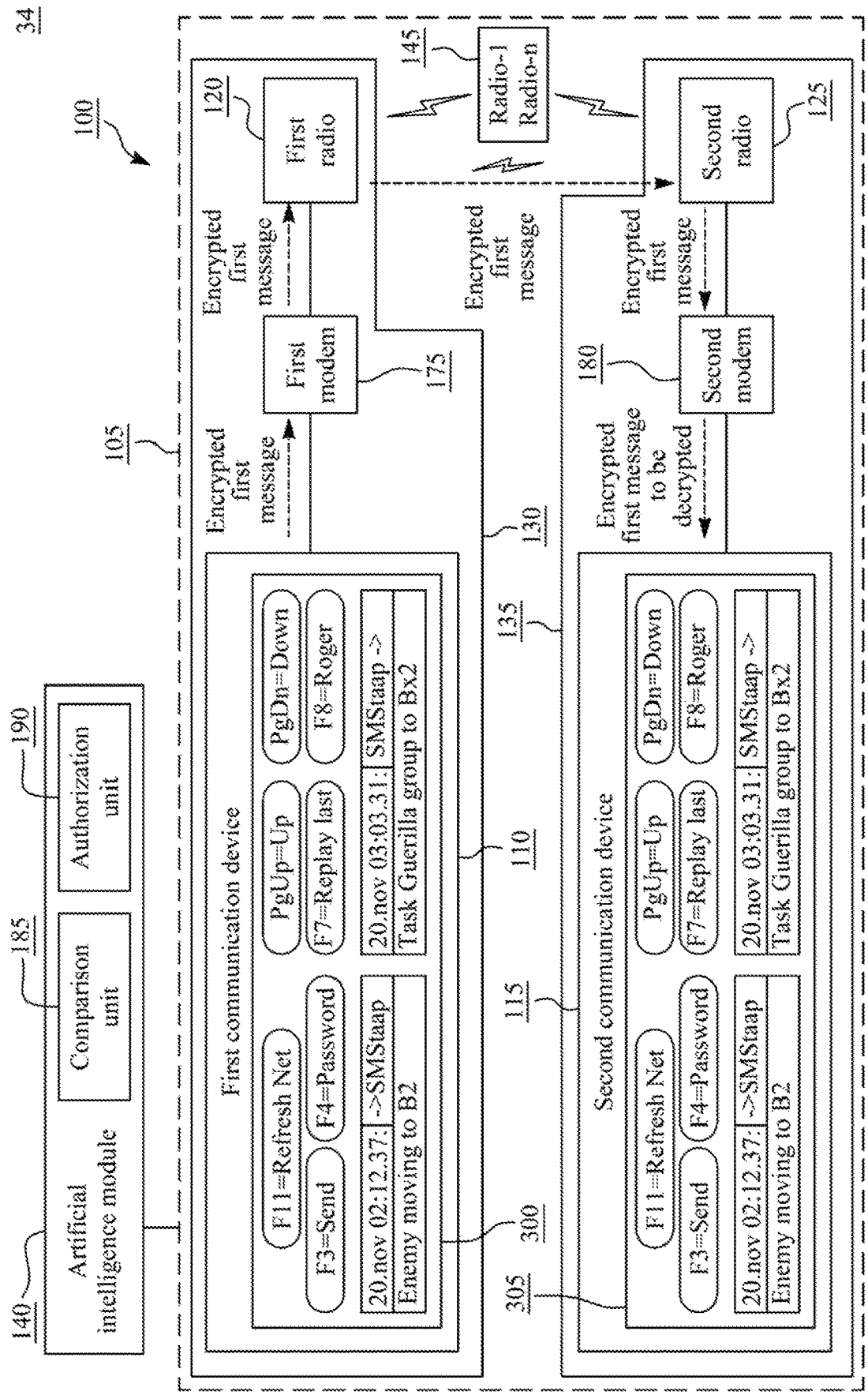
FIG. 3E demonstrates an embodiment 34 of the software program product user interfaces showing a comparison unit and an authorization unit, in accordance with the invention as a screen shot diagram.

FIG. 3E demonstrates an embodiment 34 of the software program product user interfaces 300 and 305 showing the comparison unit 185 and the authorization unit 190, in accordance with the invention as a screen shot diagram. This could be for example the screen of a smartphone. The system behind the user interfaces could be e.g. embodiments 10, 11, 12, 13, 14, 15, and/or 16 explained earlier.

According to an embodiment, the artificial intelligence module 140 comprises the comparison unit 185 and the authorization unit 190. In said embodiment, the comparison unit 185 is configured to compare the first message received by the first modem 175 and the first message encrypted by the first communication device 110 to check for any discrepancy. Further, the authorization unit 190 may authorize the communication of the first message wirelessly between the first radio 120 and the second radio 125 based on the comparison. For instance, if no discrepancy is found in the comparison results, the artificial intelligence module 140 authorizes the communication of the first message between the first radio 120 and the second radio 125.

Any features of embodiment 34 may be readily combined or permuted with any of the other embodiments 10, 11, 12, 13, 14, 15, 16, 20, 21, 22, 23, 24, 25, 26, 30, 31, 32, 33, 35, and/or 36 in accordance with the invention.

Figure 3F:
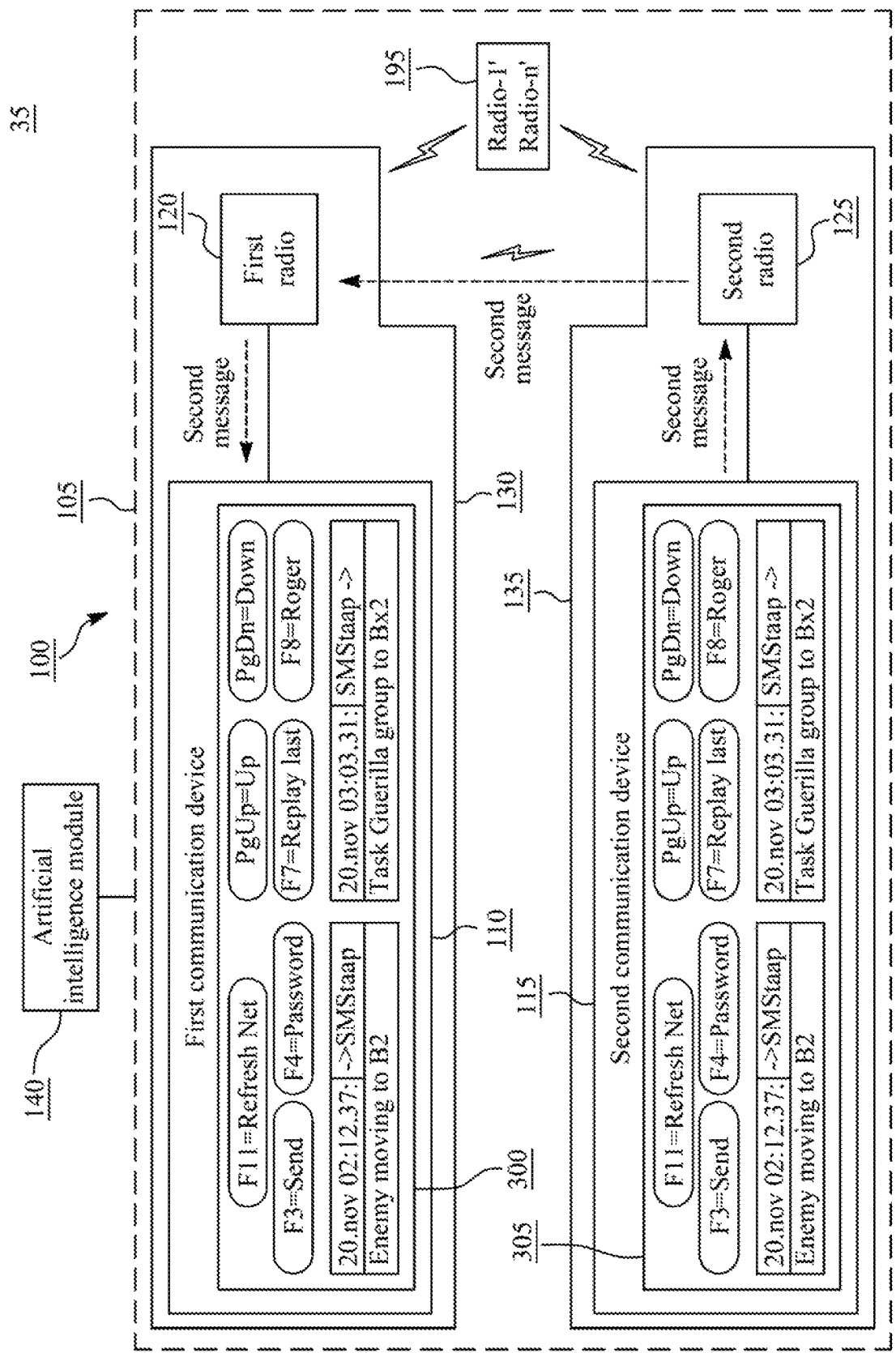
FIG. 3F demonstrates an embodiment 35 of the software program product user interfaces showing for communication of a second message in response to the first message from the second communication device to the first communication device, in accordance with the invention as a screen shot diagram.

FIG. 3F demonstrates an embodiment 35 of the software program product user interfaces 300 and 305 showing for communication of a second message in response to the first message from the second communication device 115 to the first communication device 110, in accordance with the invention as a screen shot diagram. This could be for example the screen of a smartphone. The system behind the user interfaces could be e.g. embodiments 10, 11, 12, 13, 14, 15, and/or 16 as explained earlier.

According to an embodiment, once the user B of the second communication device 115 receives the first message from the user A of the first communication device 110, the user B may create a second message in response to the first message using the user interface 305. In one example, the user B may create a message "Task Guerilla group to Bx2" in response to the message "Enemy moving to B2" received from the user A. Further, the user B communicates the message to the second radio 125 to be further communicated to the user A of the first communication device 110. Thus, the second radio 125 receives the second message in response to the first message from the second communication device 115. Subsequently, the artificial intelligence module 140 is configured to determine a second set of radio links for connecting a second set of radios 195 from amongst the multiple radios to establish a second wireless communication channel between the second radio 125 and the first radio 120.

Further, the second set of radios 195 is configured to communicate the second message to the first radio 120 via the second wireless communication channel. Finally, the user A of the first communication device 110 receives the second message from the first radio 120 at the user interface 300.

Any features of embodiment 35 may be readily combined or permuted with any of the other embodiments 10, 11, 12, 13, 14, 15, 16, 20, 21, 22, 23, 24, 25, 26, 30, 31, 32, 33, 34, and/or 36 in accordance with the invention.

Figure 3G:
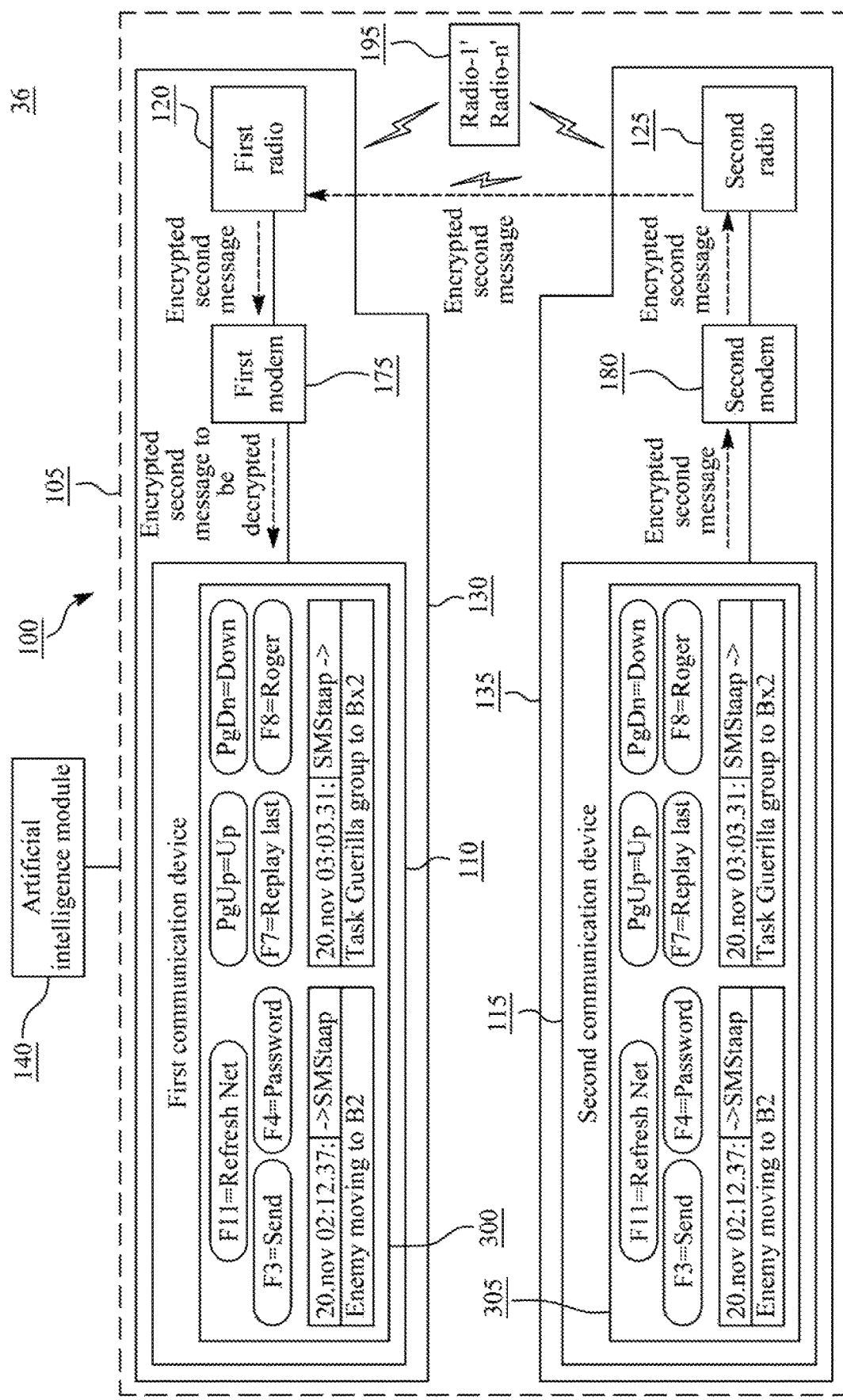
FIG. 3G demonstrates an embodiment 36 of the software program product user interfaces showing encryption and decryption of the second message by the second communication device and the first communication device, respectively, in accordance with the invention as a screen shot diagram.

FIG. 3G demonstrates an embodiment 36 of the software program product user interfaces 300 and 305 showing encryption and decryption of the second message by the second communication device 115 and the first communication device 110, respectively, in accordance with the invention as a screen shot diagram. This could be for example the screen of a smartphone. The system behind the user interfaces could be e.g. embodiments 10, 11, 12, 13, 14, 15 and/or 16 as explained earlier.

According to an embodiment, when the user B of the second communication device 115 types the second message using the user interface 305, and forwards the message, the second communication device 115 encrypts the second message into an unreadable form. Further, the second modem 180 communicates the encrypted second message to the second radio 125. On receiving the encrypted second message, the second radio 125 communicates the encrypted second message wirelessly to the first radio 120. As described earlier, since there is no direct connection between the first radio 120 and the second radio 125, the encrypted second message is wirelessly communicated to the first radio 120 via the second wireless communication channel established by the second set of radios 195.

Upon receiving the encrypted second message, the first radio 120 communicates the encrypted second message to the first modem 175. The first communication device 115 decrypts the encrypted second message into a readable format. Further, the first modem 175 communicates the decrypted second message to the user A of the first communication device 110 at the user interface 300.

Any features of embodiment 36 may be readily combined or permuted with any of the other embodiments 10, 11, 12, 13, 14, 15, 16, 20, 21, 22, 23, 24, 25, 26, 30, 31, 32, 33, 34, and/or 35 in accordance with the invention.

Figure 4:
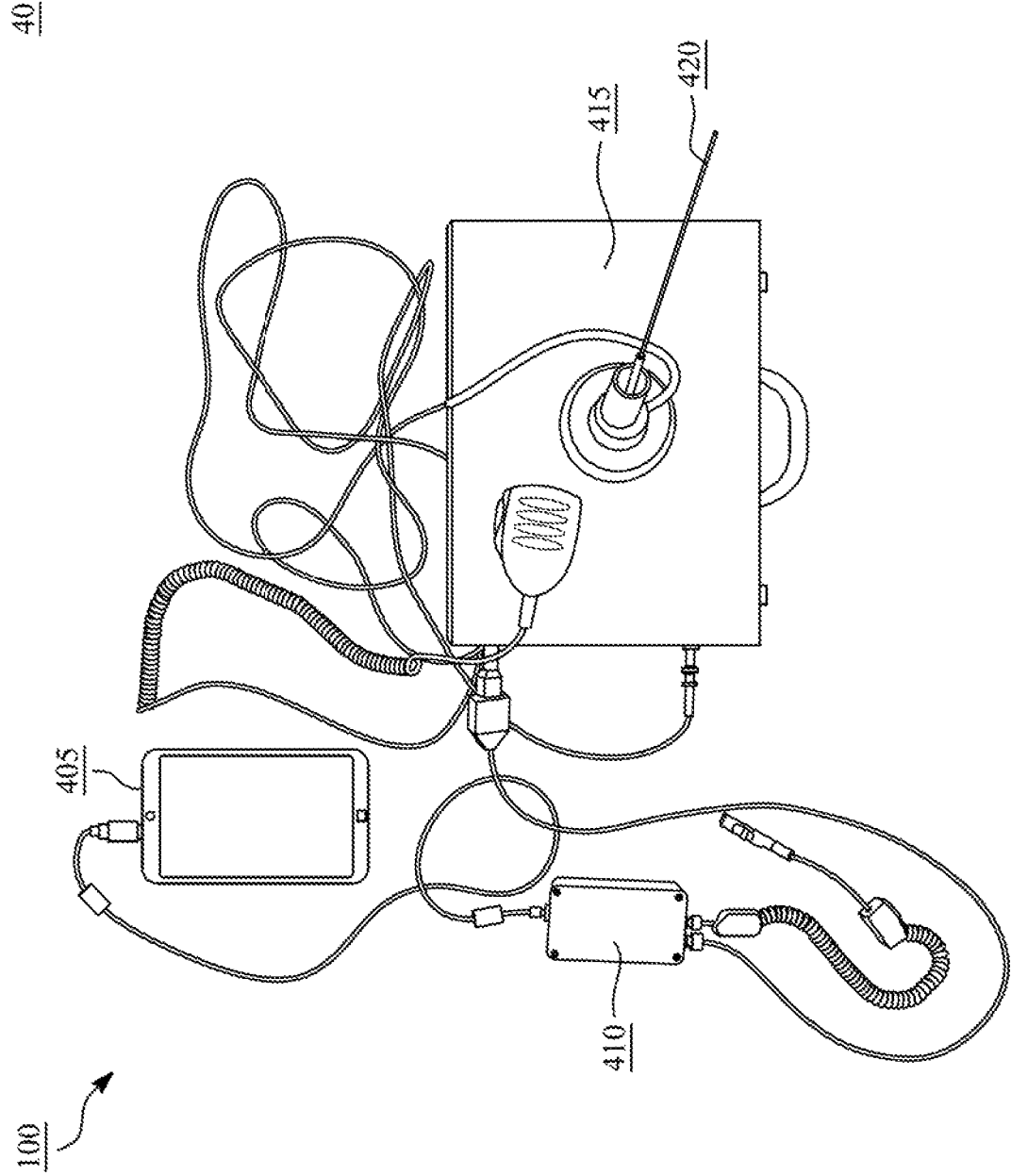
FIG. 4 demonstrates a practical prototype embodiment 40 of the communication system comprising a tablet computer, a modem, and a radio, in accordance with the invention as a pictorial diagram.

FIG. 4 demonstrates a practical prototype embodiment 40 of the communication system 100 comprising a tablet computer 405, a modem 410, and a radio 415, in accordance with the invention as a pictorial diagram.

As can be seen in FIG. 4, an image of a single drive with the tablet computer 405, the modem 410, and the radio 415 having antenna 420 illustrated. In an example, the radio 415 is an analogue radio with batteries. For instance, the radio 415 may be a high power walkie talkie. In this practical prototype, all messaging logic is in the tablet computer and the cloud network to which it is connected to. The messages are communicated via the audio in and out of the analog radio 415 with the modem 410.

Any features of embodiment 40 may be readily combined or permuted with any of the other embodiments 10, 11, 12, 13, 14, 15, 16, 20, 21, 22, 23, 24, 25, 26, 30, 31, 32, 33, 34, 35, and/or 36 in accordance with the invention.

The invention has been explained in the aforementioned and sizable advantages have been demonstrated. The secure communication system 100 is a cyber-secure system that is mainly used by military and civil organizations for reliable and secure peer-to-peer text messaging. Additionally, the secure communication system 100 is configured to use those radios that are in service and the military soldiers are familiar with. In an example, the learning curve for an average user as to how to use the communication devices for communication of messages is less than an hour and for most who are familiar with tablet computers, it is few minutes. Further, the secure communication system 100 is an economical and infrastructure-less peer-to-peer system that does not need to use satellites, fixed infrastructure, base stations, routing tables or any pre-configuration of message routing. In an example, the routing paths are automatically created, with maximum jump count of 16 radios between the first radio 120 and the second radio 125. In case the radios are destroyed or moved, the network routing automatically reconfigures itself. The secure communication system 100 facilitates secure communication of messages to large geographical distances even in crisis situations, for example when civil networks are down due to natural disasters, war, etc. Since, the secure communication system 100 is an infrastructure independent structure, the secure communication system 100 is resilient to attacks by enemies as the positions of the secure communication system 100 radios cannot be easily located by the enemies.

The invention has been explained above with reference to the aforementioned embodiments. However, it is clear that the invention is not only restricted to these embodiments, but comprises all possible embodiments within the spirit and scope of the inventive thought and the following patent claims.

The invention claimed is:

1. A communication system for communicating messages in a communication network comprising a first communication device, a second communication device and a plurality of radios, comprising:

a first radio of the plurality of radios is configured to receive a first message from the first communication device via a wireline; and at least one artificial intelligence module configured to determine a coverage area of the first radio; wherein the at least one artificial intelligence module is configured to:

determine at least one radio link for connecting to a second radio, of the plurality of radios and outside the coverage area of the first radio, wherein the second radio is configured to receive the first message wirelessly from the first radio, and wherein the first communication device is configured to encrypt the first message;

compare the first message and the first message encrypted by the first communication device;

authorize communication of the first message wirelessly between the first radio and the second radio based on the comparison; and determine a first set of radio links for connecting a first set of radios of the plurality of radios to establish a first wireless communication path between the first radio and the second radio, when the second radio is outside the coverage area of the first radio;

wherein the first set of radios is configured to communicate the first message to the second radio via the first wireless communication path;

wherein the second communication device is configured to receive the first message from the second radio via the wireline; and wherein the second communication device is configured to decrypt the first message communicated to the second radio.

2. The communication system as claimed in claim 1, wherein the at least one artificial intelligence module is further configured to be multi-tasked between the plurality of radios to combine parts of data from the plurality of radios, and the at least one artificial intelligence module acts as a singular artificial intelligence module operating in real-time over the plurality of radios of the communication network.

3. The communication system as claimed in claim 1, wherein the at least one artificial intelligence module is further configured to enable communication between the first communication device, the second communication device, and the plurality of radios.

4. The communication system as claimed in claim 1, wherein the at least one artificial intelligence module is further configured to adjust communicating quota for each of the plurality of radios by needs of the at least one artificial intelligence module to communicate data from each of the plurality of radios, thereby maintaining optimum network integrity in the communication network.

5. The communication system as claimed in claim 1, wherein the at least one artificial intelligence module is further configured to handle whole routing paths from the first radio to the second radio such that part of data of each of the plurality of radios only contains information about a next optimum radio to pass the first message on, wherein the at least one artificial intelligence module contains the data of the whole routing paths including all middle points in the whole routing paths.

6. The communication system as claimed in claim 1, wherein the at least one artificial intelligence module is further configured to use deep learning algorithms and map data of error proneness and operation of communication channels between each of the plurality of radios to avoid routes that work at a particular time and based on communication history are analyzed to be unreliable in different critical situations, wherein the critical situations comprise at least one of a high channel load, a particular date, a particular daytime, user interface usage, a battery voltage, environment light, global positioning system (GPS) coordinates, and a motion state of the plurality of radios determined by a motion sensor.

7. The communication system as claimed in claim 1, wherein the at least one artificial intelligence module is further configured to learn common message types sent in the communication network and enforce on better compression methods and keywords for the common message types, so the plurality of radios have the messages better coded even before sending the messages.

8. The communication system as claimed in claim 1, wherein:

the second radio is configured to receive a second message in response to the first message from the second communication device via a wireline;

the at least one artificial intelligence module is further configured to identify at least one radio link of the first set of radios that is unavailable;

the at least one artificial intelligence module is further configured to determine a second set of radio links for connecting a second set of radios of the plurality of radios to establish a second wireless communication channel between the second radio and the first radio, when the at least one radio of the first set of radios is unavailable;

the second set of radios is configured to communicate the second message to the first radio via the second wireless communication channel; and the first communication device is configured to receive the second message from the first radio via the wireline.

9. The communication system as claimed in claim 8, wherein the second communication device is configured to encrypt the second message, and the first communication device is configured to decrypt the second message communicated to the first radio.

10. The communication system as claimed in claim 1, wherein the plurality of radios are configured to maintain a high signal-to-interference-plus-noise ratio (SINR) value.

11. The communication system as claimed in claim 1, wherein each of the plurality of radios is configured to select an alternate frequency for the communication of the messages when a predetermined frequency is unavailable.

12. A method for communicating messages in a communication network, comprising a first communication device, a second communication device, and a plurality of radios, comprising:

receiving a first message from the first communication device via a wireline, by a first radio of the plurality of radios;

determining a coverage area of the first radio by at least one artificial intelligence module;

determining at least one radio link for connecting to a second radio of the plurality of radios outside the coverage area of the first radio by the at least one artificial intelligence module, wherein the second radio is configured to receive the first message wirelessly from the first radio;

encrypting a first message by the first communication device;

comparing the first message and the first message encrypted by the first communication device, by the at least one artificial intelligence module;

authorizing communication of the first message wirelessly between the first radio and the second radio based on the comparison, by the at least one artificial intelligence module;

determining a first set of radio links connecting a first set of radios of the plurality of radios to establish a first wireless communication path between the first radio and the second radio by the at least one artificial intelligence module, when the second radio is outside the coverage area of the first radio;

communicating the first message to second radio via the first wireless communication path;

receiving the first message from the second radio by the second communication device via the wireline; and decrypting the first message communicated to the second radio by the second communication device.

13. The method as claimed in claim 12, wherein the at least one artificial intelligence module is further configured to be multi-tasked between the plurality of radios to combine parts of data from the plurality of radios, and the at least one artificial intelligence module acts as a singular artificial intelligence module operating in real-time over the plurality of radios of the communication network.

14. The method as claimed in claim 12, wherein the at least one artificial intelligence module is further configured to enable communication between the first communication device, the second communication device, and the plurality of radios.

15. The method as claimed in claim 12, wherein adjusting communicating quota for each of the plurality of radios by needs of the at least one artificial intelligence module to communicate data from each of the plurality of radios, thereby maintaining optimum network integrity in the communication network.

16. The method as claimed in claim 12, wherein handling as whole routing paths from the first radio to the second radio such that part of data of each of the plurality of radios only contains information about a next optimum radio to pass the first message on, wherein the at least one artificial intelligence module contains the data of the whole routing paths including all middle points in the whole routing paths.

17. The method as claimed in claim 12, wherein using deep learning algorithms and mapping data of error proneness and operation of communication channels between each of the plurality of radios to avoid routes that work at a particular time and based on communication history are analysed to be unreliable in different critical situations, wherein the critical situations comprise at least one of a high channel load, a date, a daytime, user interface usage, a battery voltage, environment light, global positioning system (GPS) coordinates, and a motion state of the plurality of radios determined by a motion sensor.

18. The method as claimed in claim 12, wherein learning common message types sent in the communication network and enforcing on better compression methods and keywords for the common message types, so the plurality of radios have the messages better coded even before sending the messages.

19. The method as claimed in claim 12, wherein:
receiving a second message in response to the first message from the second communication device via the wireline, by the second radio;
identifying that at least one radio link of the first set of radios is unavailable by the at least one artificial intelligence module;
determining a second set of radio links for connecting a second set of radios of the plurality of radios to establish a second wireless communication channel between the second radio and the first radio by the at least one artificial intelligence module, when the at least one radio of the first set of radios is unavailable;
communicating the second message to the first radio via the second wireless communication channel; and
receiving the second message from the first radio by the first communication device via the wireline.

20. The method as claimed in claim 19, further comprising encrypting the second message by the second communication device, and decrypting the second message communicated to the first radio by the first communication device.

21. The method as claimed in claim 12, further comprising maintaining a high signal-to-interference-plus-noise ratio (SINR) value at the plurality of radios.

22. The method as claimed in claim 12, further comprising selecting an alternate frequency for the communication of the messages when a predetermined frequency is unavailable.

23. A non-transitory computer-readable storage medium having software program product code embodied therewith, the software program product code containing an artificial intelligence module configured to determine a coverage area of a first radio, the artificial intelligence module executable by one or more computer processors to perform an operation for communicating messages in a communication network comprising a first communication device, a second communication device, and a plurality of radios, wherein the first radio is one of the plurality of radios and is configured to receive a first message from the first communication device via a wireline, the operation comprising:
determining at least one radio link for connecting to a second radio of the plurality of radios outside the coverage area of the first radio, wherein the second radio is configured to receive the first message wirelessly from the first radio, wherein the first communication device is configured to encrypt the first message;
comparing the first message and the first message encrypted by the first communication device;
authorizing communication of the first message wirelessly between the first radio and the second radio based on the comparison; and
determining a first set of radio links connecting a first set of radios of the plurality of radios to establish a first wireless communication channel between the first radio and the second radio, when the second radio is outside the coverage area of the first radio, wherein:
the first set of radios is configured to communicate the first message to the second radio via the first wireless communication channel;
the second communication device is configured to receive the first message from the second radio via the wireline; and
the second communication device is configured to decrypt the first message communicated to the second radio via the wireline.

24. The non-transitory computer-readable storage medium having software program product as claimed in claim 23, wherein the at least one artificial intelligence module is further configured to be multi-tasked between the plurality of radios to combine parts of data from the plurality of radios, and the at least one artificial intelligence module acts as a singular artificial intelligence module operating in real-time over the plurality of radios of the communication network.

25. The non-transitory computer-readable storage medium having software program product as claimed in claim 23, wherein the at least one artificial intelligence module is further configured to enable communication between the first communication device, the second communication device, and the plurality of radios.

26. The non-transitory computer-readable storage medium having software program product as claimed in claim 23, wherein the at least one artificial intelligence module is further configured to adjust communicating quota for each of the plurality of radios by needs of the at least one artificial intelligence module to communicate data from each of the plurality of radios, thereby maintaining optimum network integrity in the communication network.

27. The non-transitory computer-readable storage medium having software program product as claimed in claim 23, wherein the at least one artificial intelligence module is further configured to handle whole routing paths from the first radio to the second radio such that part of data of each of the plurality of radios only contains information about a next optimum radio to pass the first message on, wherein the at least one artificial intelligence module contains the data of the whole routing paths including all middle points in the whole routing paths.

28. The non-transitory computer-readable storage medium having software program product as claimed in claim 23, wherein the at least one artificial intelligence module is further configured to use deep learning algorithms and map data of error proneness and operation of communication channels between each of the plurality of radios to avoid routes that work at a particular time and based on communication history are analysed to be unreliable in different critical situations, wherein the critical situations comprise at least one of a high channel load, a date, a daytime, user interface usage, a battery voltage, environment light, global positioning system (GPS) coordinates, and a motion state of the plurality of radios determined by a motion sensor.

29. The non-transitory computer-readable storage medium having software program product as claimed in claim 23, wherein the at least one artificial intelligence module is further configured to learn common message types sent in the communication network and enforce on better compression methods and keywords for the common message types, so the plurality of radios have the messages better coded even before sending the messages.

30. The non-transitory computer-readable storage medium having software program product as claimed in claim 23, wherein:
the second radio is configured to receive a second message in response to the first message from the second communication device via a wireline;
the at least one artificial intelligence module is further configured to identify that at least one radio link for connecting to at least one radio of the first set of radios is unavailable;
the at least one artificial intelligence module is further configured to determine a second set of radio links for connecting a second set of radios of the plurality of radios to establish a second wireless communication channel between the second radio and the first radio, when the at least one radio of the first set of radios is unavailable;
the second set of radios is configured to communicate the second message to the first radio via the second wireless communication channel; and
the first communication device is configured to receive the second message from the first radio via the wireline.

31. The non-transitory computer-readable storage medium having software program product as claimed in claim 30, wherein the second communication device is configured to encrypt the second message, and the first communication device is configured to decrypt the second message communicated to the first radio.

32. The non-transitory computer-readable storage medium having software program product as claimed in claim 23, wherein the plurality of radios are configured to maintain a high signal-to-interference-plus-noise ratio (SINR) value.

33. The non-transitory computer-readable storage medium having software program product as claimed in claim 23, wherein each of the plurality of radios is configured to select an alternate frequency for the communication of the messages when a predetermined frequency is unavailable.

* * * * *